United States Patent [19]

Oho et al.

[11] Patent Number: 4,969,082
[45] Date of Patent: Nov. 6, 1990

[54] CONTROL METHOD FOR A COLLECTIVE WIRING SYSTEM

[75] Inventors: Shigeru Oho, Hitachi; Takeshi Hirayama, Mito; Masahiro Matsumoto, Yokohama; Akira Hasegawa; Fumio Hamano, both of Katsuta; Takanori Shibata, Hitachi, all of Japan

[73] Assignee: Hitachi, Ltd., Tokyo, Japan

[21] Appl. No.: 372,698

[22] Filed: Jun. 28, 1989

Related U.S. Application Data

[63] Continuation of Ser. No. 171,419, Mar. 21, 1988, Pat. No. 4,855,896, which is a continuation of Ser. No. 777,441, Sep. 18, 1985, abandoned.

[30] Foreign Application Priority Data

Feb. 23, 1985 [JP] Japan .................................. 60-33658
Mar. 25, 1985 [JP] Japan .................................. 60-58438

[51] Int. Cl.$^5$ ..................... G06F 15/46; G05B 19/02
[52] U.S. Cl. ........................... 364/138; 340/825.07; 364/140; 364/424.05; 364/900
[58] Field of Search ................. 364/140–147, 364/138, 139, 425, 200 MS File, 900 MS File, 424.01, 424.05; 371/29.1; 340/825.06, 825.07, 825.15, 825.17; 361/428

[56] References Cited

U.S. PATENT DOCUMENTS

| | | | |
|---|---|---|---|
| 4,019,172 | 4/1977 | Srodes | 371/22 |
| 4,185,272 | 1/1980 | Feiker | 340/825.06 |
| 4,218,745 | 8/1980 | Perkins | 371/29.1 |
| 4,293,924 | 10/1981 | Struger et al. | 364/900 |
| 4,404,651 | 9/1983 | Grudowski | 364/140 |
| 4,414,160 | 1/1982 | Kaufman et al. | 364/200 |
| 4,550,366 | 10/1985 | Toyama et al. | 364/138 X |
| 4,586,040 | 4/1986 | Akiba et al. | 340/825.15 X |
| 4,608,628 | 8/1986 | Saito et al. | 371/29 X |

FOREIGN PATENT DOCUMENTS

| | | |
|---|---|---|
| 0117832 | 9/1984 | European Pat. Off. |
| 3317652 | 11/1984 | Fed. Rep. of Germany |
| 2445769 | 8/1980 | France |
| 58-106666 | 6/1983 | Japan |

OTHER PUBLICATIONS

Preston et al–"Multiprocessor Implementation of the Logic Function of A Multiplexed Wiring System for Automotives"–IEEE Proc., vol. 129, Pt. E, No. 6, Nov. 1982, pp. 223–228.

Primary Examiner—Joseph Ruggiero
Attorney, Agent, or Firm—Antonelli, Terry, Stout & Kraus

[57] ABSTRACT

A collective wiring system for an automobile provides a central control unit which communicates with a plurality of terminal control units each connected to one or more input or output devices, such as switches, sensors, motors and the like. The control over output devices in response to the status of input devices is performed by the central control unit on the basis of tables of data stored in memory. A scan table controls the order in which data communications are made to the terminal control units to obtain their status and provide them with control commands. A monitor table stores the current status of the terminal control units and a control table stores the control data for the terminal control units. A connection table stores the relationship between the terminal control unit for an input device and the terminal control unit for the output device to be controlled thereby. Thus, connection control between input and output devices is effected by software.

5 Claims, 28 Drawing Sheets

FIG. 29

| LCU NO. | LCU 1 | LCU 2 | LCU 3 |
|---|---|---|---|
| CIM ADDRESS | $7 | $8 | $3 |
| DIO 0 | HEAD LAMP (L) | TAIL LAMP | STARTER MOTOR |
| 1 | HEAD LAMP (H) | LICENCE LAMP | ⎫ OPTION OUTPUT |
| 2 | CLEARANCE LAMP | REAR Def | |
| 3 | ⎫ OPTION OUTPUT | ⎫ OPTION OUTPUT | IG·SW·Acc |
| 4 | | | IG·SW·ON |
| 5 | | | IG·SW·START |
| 6 | | | LIGHTING SW |
| 7 | ⎫ OPTION INPUT | ⎫ OPTION INPUT | HEAD LAMP SW (L) |
| 8 | | | HEAD LAMP SW (H) |
| 9 | | | REAR Def SW |
| 10 | | | PARKING LAMP SW |
| 11 | | | ⎫ OPTION INPUT |
| 12 | | | |
| 13 | | | |

FIG. 30

|  | CIM | LCU |
|---|---|---|
| SCNTBL +0 | 7 | 1 |
| 1 | 8 | 2 |
| 2 | 3 | 3 |

FIG. 31

|  |  | 1ST BYTE | 2ND BYTE | 3RD BYTE |
|---|---|---|---|---|
| CCTBL | +0 | 0 2 | 4 1 | 3 2 |
|  | 3 | 0 2 | 4 1 | 4 2 |
|  | 6 | 0 2 | 0 2 | 5 0 |
|  | 9 | 0 2 | 8 0 | 6 2 |
|  | 12 | 0 2 | 8 1 | 6 0 |
|  | 15 | 0 2 | 0 1 | 6 1 |
|  | 18 | 0 2 | 0 0 | 7 0 |
|  | 21 | 0 2 | 0 0 | 8 1 |
|  | 24 | 0 2 | 4 1 | 9 2 |
|  | 27 | 0 2 | 8 0 | A 2 |
|  | 30 | 0 2 | 8 1 | A 0 |
|  |  | 0 0 | 0 0 | 0 0 |
| ORTBL | +0 | 0 2 | 0 0 | 6 2 |
|  | 3 | 0 2 | 0 0 | A 2 |
|  | 6 | 0 2 | 0 1 | 6 0 |
| ORSTP |  | 0 2 | 0 1 | A 0 |
|  |  | 0 0 | 0 0 | 0 0 |
| ANDTBL | +0 | 0 2 | 0 1 | 3 2 |
|  | +3 | 0 2 | 0 1 | 4 2 |
| ANDSTP |  | 0 2 | 0 1 | 9 2 |

FIG. 32

|  | 1ST BYTE | 2ND BYTE | 3RD BYTE |  |
|---|---|---|---|---|
| STATTB +0 | o o | o o | o o | LCU 1 |
| RECEIVING 3 | o o | o o | o o | LCU 2 |
| 6 | o o | o o | o o | LCU 3 |

|  | | | |  |
|---|---|---|---|---|
| CNTLTB +0 | o o | o o | o o | LCU 1 |
| TRANSMISSION 3 | o o | o o | o o | LCU 2 |
| 6 | o o | o o | o o | LCU 3 |

FIG. 34

| STATTB +0 | o o | o o | o o |
|---|---|---|---|
| RECEIVING 3 | o o | o o | o o |
| 6 | 1 o | o o | o o |

| CNTLTB +0 | o o | o o | o o |
|---|---|---|---|
| TRANSMISSION 3 | o o | o o | o o |
| 6 | o o | o o | o o |

FIG. 35

| STATTB +0 | o o | o o | o o |
|---|---|---|---|
| RECEIVING 3 | o o | o o | o o |
| 6 | 1 o | o o | o o |

| CNTLTB +0 | o o | o o | o o |
|---|---|---|---|
| TRANSMISSION 3 | o o (20) | o o | o o |
| 6 | 1 o | o o | o o |

FIG. 33

(A) NO.3 TERMINAL OF CIM IS "1"

| TERMINAL (DIO) NO. | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONNECTION DATA | 0 | 0 | 0 | 1 | 0 | 0 | 0 | 0 | 0 | 0 | 0 | 0 | 0 | 0 |
| 4-BIT BINARY NUMBER | 1 | | | | 0 | | | | 0 | | | | 0 | |

(B) NO.4 AND NO.5 OF CIM ARE "1"

| TERMINAL (DIO) NO. | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONNECTION DATA | 0 | 0 | 0 | 0 | 1 | 1 | 0 | 0 | 0 | 0 | 0 | 0 | 0 | 0 |
| 4-BIT BINARY NUMBER | 0 | | | | C | | | | 0 | | | | 0 | |

(C) NO.3 AND NO.4 OF CIM ARE "1"

| TERMINAL (DIO) NO. | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONNECTION DATA | 0 | 0 | 0 | 1 | 1 | 0 | 0 | 0 | 0 | 0 | 0 | 0 | 0 | 0 |
| 4-BIT BINARY NUMBER | 1 | | | | 8 | | | | 0 | | | | 0 | |

(D) NO.1, NO.4 AND NO.5 OF CIM ARE "1"

| TERMINAL (DIO) NO. | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CONNECTION DATA | 1 | 0 | 0 | 0 | 1 | 1 | 0 | 0 | 0 | 0 | 0 | 0 | 0 | 0 |
| 4-BIT BINARY NUMBER | 8 | | | | C | | | | 0 | | | | 0 | |

FIG. 37

| | | | | |
|---|---|---|---|---|
| STATTB (RECEIVING) | +0 | 00 | 00 | 00 |
| | 3 | 00 | 00 | 00 |
| | 6 | 00 | 20 | 00 |
| CNTLTB (TRANSMISSION) | +0 | 00 | 00 | 00 |
| | 3 | 00 | 00 | 00 |
| | 6 | 00 | 00 | 00 |

→

| | | |
|---|---|---|
| 00 | 00 | 00 |
| 00 | 00 | 00 |
| 00 | 20 | 00 |
| 20 | 00 | 00 |
| 80 | 00 | 00 |
| 00 | 20 | 00 |

CONTROL METHOD FOR A COLLECTIVE WIRING SYSTEM

This application is a continuation of application Ser. No. 171,419, filed Mar. 21, 1988, U.S. Pat. No. 4,855,896 which is a continuation of Ser. No. 777,441 filed Sept. 18, 1985, abandoned.

FIELD OF THE INVENTION

The present invention relates to a multiple signal transmission system, or more in particular to a load control system for a collective wiring system of an automobile.

BACKGROUND OF THE INVENTION

A number of electrical devices, such as various types of lamps, motors, actuators and sensors, are mounted on an automobile to perform various control and indicating functions, and the number of such devices provided on an automobile is on the increase.

In automobiles in current use, these electrical devices are wired individually. As a result, the wire bundles (known as the wire harness) are complicated and increase in size with the increase in the number of electrical devices, thereby posing a great problem in the design of the automobile. Specifically, both the cost and weight of the wiring harness have increased with the increase in complexity of the automobile electrical system, while the space for wiring within the automobile has decreased. Further, with recent advances in car electronics, a number of electronic devices, including a microcomputer, are now mounted on the car, with the result that signals transmitted by the wire harness include not only simple on/off signals, but also include numerous data signals of more complicated form, thus presenting the hazard of false operation of equipment as a result of data inversion of the transmitted signals caused by noise.

As a means of solving these problems, it has been suggested to adopt the technique of multiplex signal transmission which is already widely used in the field of communications for use in automobiles to transmit the many signals between devices by means of a small number of wires. In such a signal transmission system, optical fiber cables which are light in weight and non-inductive are used as a transmission path. Such a system is disclosed in Japanese Patent Laid-Open No. 105490/80 and No. 136149/83.

A data transmission system in the form of a collective wiring system is disclosed in Japanese Application No. 106666/83 (corresponding to U.S. application Ser. No. 619,998, filed June 12, 1984), in which an optical fiber cable is used as a signal transmission path, so that a central control unit (hereinafter referred to merely as a "CCU") is coupled with a plurality of terminal processing units (hereinafter referred to merely as "LCU") by means of an optical signal channel. The CCU is arranged preferably at an appropriate point near the dashboard of the automobile to control the whole system. A predetermined number of LCU's are arranged, on the other hand, at locations near groups of electrical devices mounted in the automobile, such as operating switches, display units, meters, lamps and sensors of various types. A photo-electric conversion module for two-way conversion of an optical signal and an electrical signal is provided at the part where the CCU and each LCU is connected to the optical fiber cable. In this system, the CCU is provided with a microcomputer and has a data communication function based on the transmission of serial data. In correspondence with this, each LCU has one or a plurality of communication processing circuits which form communication interface modules (hereinafter referred to merely as "CIM"). The CCU selects an LCU and then the CIMs in the LCU sequentially exchange data with a CIM thus selected. By repeating this, multiplex transmission with all of the CIMs becomes possible through the optical fiber cable, thus simplifying the complicated bulky wirings in the automobile. In such a data transmission system as this, the computer of the CCU (hereinafter referred to as "the micom") has the functions to analyze and process the data received from each LCU, determine the LCU to which data is to be transmitted next, while at the same time preparing transmission data containing control information for the particular LCU and applying the same to the CIM in the CCU.

In an application of this data transmission system to the collective wiring system of an automobile or the like, the series of control operations which the micom is required to perform must be carried out at sufficiently high speed in order to guarantee smooth control of the automobile or the like. In the case where a lamp is to flicker in response to the operation of an operation switch, for instance, the control operation of the micom in the CCU, if not as speedy as required, would cause delayed lamp flickering. This delay may pose a serious problem depending on the nature of the control.

The collective wiring system in an automobile, on the other hand, generally involves a very great number of loads (terminals) for data exchange, sometimes as many as several hundred, often requiring direct connection of the load to the CCU, and therefore not only data transmission control by the CIM but also many other various processing operations are required of the micom of the CCU. In the conventional collective wiring systems for automobiles using a data transmission system, therefore, with an increase in the number of loads, the processing capacity of the micom of the CCU may become insufficient causing a delayed control operation, and thereby making it impossible to maintain a desired level of control response. Thus, it is essential to provide for the micom a most efficient operating procedure.

Some automotive devices have an input not corresponding to an output, but are not operable unless a plurality of inputs are turned on (hereinafter referred to as AND-related inputs), or are operable when any one of a plurality of inputs is turned on (hereinafter referred to as OR-related inputs), or have a plurality of loads actuated upon turning on of an input. A first example includes a rear window defroster or a fog lamp. The rear window defroster is not activated unless the rear defroster switch is turned on while the ignition key switch is also on. The fog lamp, on the other hand, is capable of being energized in many cases only when the lighting switch is on. A second example is that of OR-related inputs, which include the interior lamp, the parking lights and the hazard warning light. The lighting switch and the hazard warning switch are a third example.

A method of realizing these configurations in the collective wiring system mentioned above is either by hardware or by software. In the method using hardware, a plurality of inputs are required to be processed by AND or OR devices, resulting in lengthy wires extending throughout the automobile to and from such logic devices, which tends to substantially reduce the advantages of the use of the collective wiring system. It is, therefore, necessary to realize the logic relationship between these inputs and the loads by software. Further, it is desirable to establish correspondence easily between the number of input and output points for each model of an automobile so as to make the system easily compatible with electrical systems of different configuration.

SUMMARY OF THE INVENTION

The present invention has been developed in view of the situation mentioned above, and the main object thereof is to provide a method of control of a collective wiring system for an automobile or the like which minimizes the micom processing required for data transmission control on the one hand and which is capable of maintaining a sufficient responsiveness for the control operation on the other hand.

A further object of the present invention is to obviate the problems inherent in prior systems, and to provide a load control system for controlling one input versus one output, AND-related inputs, OR-related inputs and one input versus multiple outputs by use of a collective wiring system, while at the same time facilitating changes in input-output relations between devices in the system.

In order to achieve this object, the present invention is characterized in that the above-mentioned relationship between output and input devices is controlled in a software fashion from time to time, especially, by the use of a table of data stored in memory. For this purpose, the present invention is characterized in that information required for preparation and processing of transmission data by the micom is provided in advance as a table in memory to permit the data transmission processing by the micom by data retrieval.

In a specific embodiment, a monitor table is provided in memory which stores the status of all input devices and the micom sequentially scans all CIMs to periodically monitor the status of the input devices so that the data in the monitor table is kept up to date. There is also provided in memory a control table which stores the control status of all output devices. Thus, when the status of an input device changes, the monitor table is updated and the micom determines which output device is affected by that change so that the control status of that output device can be updated in the control table. For purposes of determining the correspondence between input devices and associated output devices, there is provided in memory a wiring logic table which stores these relationships. Thus, when the status of an input device changes, the micom consults the wiring logic table to determine which output device is affected thereby and changes the status of that output device in the control table, if necessary. As part of its command control function, the micom communicates with the CIMs to supply control commands to the output devices according to the control status data stored in the control table.

In accordance with the invention, the monitor and control tables may store status data relating to all devices. Thus, when an input device changes status the micom will read the current status data into the monitor table and then compare this data with the corresponding data for the input device in the control table. This provides a comparison between old and new data and indicates whether a change in status has occurred.

In communicating with the CIMs, the micom refers to a scan table in which the addresses of the CIMs are stored in the sequence in which the CIMs are to be accessed by the micom. Communication is effected in the half duplex mode. The micom sends to the CIM in the CCU an address of a peripheral CIM from the scan table and control data for that peripheral CIM from the control table, and the CIM in the CCU formats a message using this data and sends it to the peripheral CIM. The peripheral CIM responds within a predetermined time with a message containing monitor data, which is to be used to update the monitor table. The CIM in the CCU notifies the micom of the receipt of this data by means of an interrupt signal.

The logic relationship between inputs and loads is also provided in the wiring logic table, so that upon change of status of an input device, the micom will not only determine from the wiring logic table what output device might be affected by that change in status, but will also determine whether the status of other input devices is also involved or whether a plurality of output devices are involved.

When a failure exists in the data transmission lines or in any CIM, the micom will not receive a reply from the CIM in response to a data transmission. Thus, unless a reply is received within a predetermined time, the micom suspects the occurrence of some failure and confirms this by resending the data. After reconfirmation, the micom sets a fail flag for the suspicious CIM in the monitor table.

BRIEF DESCRIPTION OF THE DRAWINGS

The various features of the present invention will become more apparent from a description of various specific embodiments with reference to the accompanying drawings, in which:

FIG. 29 is a table illustrating exemplary connection conditions for various input and output devices of an automobile;

FIG. 30 is a diagram illustrating the scan table in the example of FIG. 29;

FIG. 31 is a diagram illustrating the connection table in the example of FIG. 29;

FIG. 32 is a diagram illustrating the status table in the example of FIG. 29;

FIG. 33 is a diagram illustrating the correspondence between the connection information and the status table; and FIGS. 34-37 illustrate changes in the status table and the connection table in the example of FIG. 29.

DESCRIPTION OF THE PREFERRED EMBODIMENTS

Before proceeding to a detailed description of the present invention, a description of a collective wiring system of the type disclosed in the aforementioned Japanese Application No. 106666/83 (corresponding to U.S. application Ser. No. 619,998) will be presented with reference to FIGS. 1 and 2 to provide an example of the type of collective wiring system to which the present invention may be applied.

Figure 1:
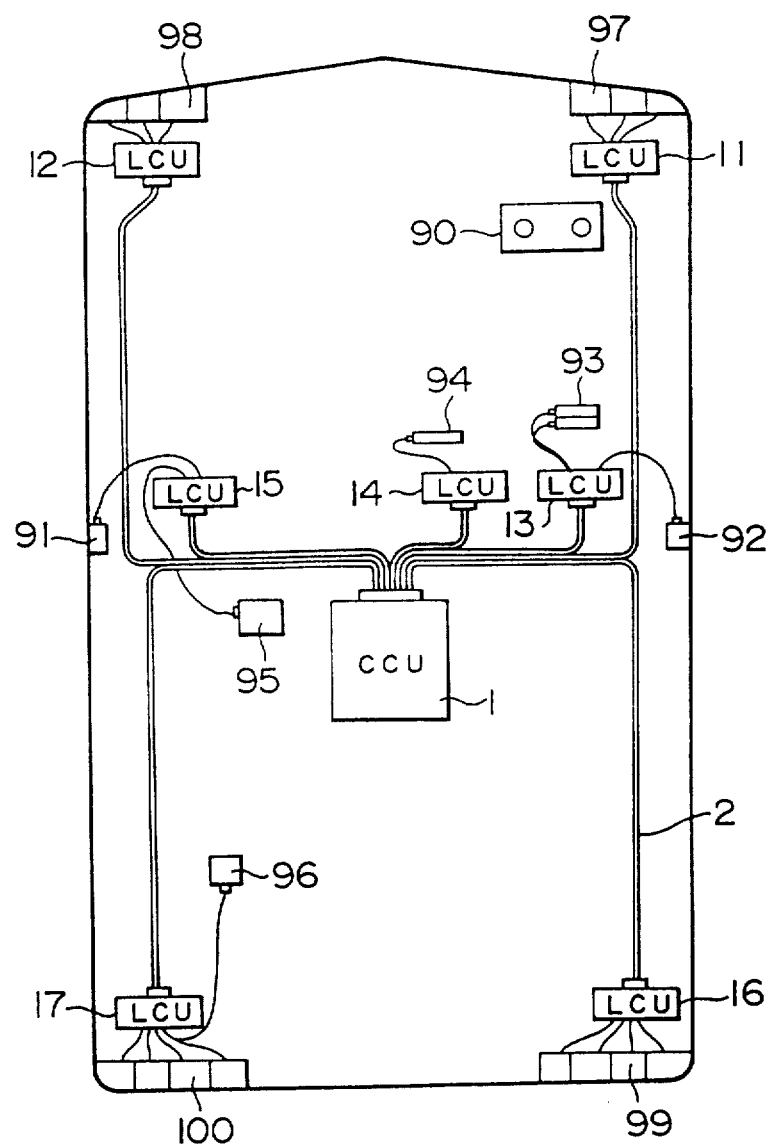
FIG. 1 is a diagram showing a collective wiring system according to the present invention mounted on a typical automobile.

FIG. 1 shows an example of an embodiment of a collective wiring apparatus mounted on an actual car according to the present invention. The CCU 1 and terminal control units (hereinafter called LCU) 11 to 17 are connected by an optical fiber communication line 2. The line CCU 1 is supplied with the status of switches or the like connected to LCU 11 to 17 and prepares and sends to LCU 11 to 17 control data to control a load associated with a respective LCU.

The right and left front light units 97 and 98 (which include headlights, parking lights and turn signal lights) and the right and left rear light units (which include tail lights, stop lights, backup lights and turn signal lights) are connected to the LCUs 97-100, respectively. An interior lamp 95 is cOnnected to LCU 15, and door switches 91 and 92 are connected to LCU 15 and 13, respectively. An ignition key switch 93 is connected to LCU 13; a rear defroster switch 94 is connected to LCU 14; and a rear window defroster 96 is connected to LCU 17. The CCU 1, upon receipt of a signal indicating the actuation of the door switch 92 from LCU 13, or the actuation of the door switch 91 from LCU 15, transmits data for lighting the interior lamp 95 to LCU 15.

In the case of the rear window defroster 96, data for actuating this unit is sent to LCU 17, and only when signals IGN and ACC are received from LCU 13 indicating that the ignition key switch 93 is turned on as in the accessory portion and when a signal is received from LCU 14 indicating that the rear defroster switch 94 is also on, will the rear window defroster be energized. In the current models of cars, the rear window defroster is operable only when a signal IGN is received indicating that the ignition key switch is on. If a collective wiring system is used, however, it is easy to obtain a logic product of the signals ACC and IGN and the signal from the rear defroster switch, so that wasteful power consumption at the time of engine start is prevented.

Figure 2:
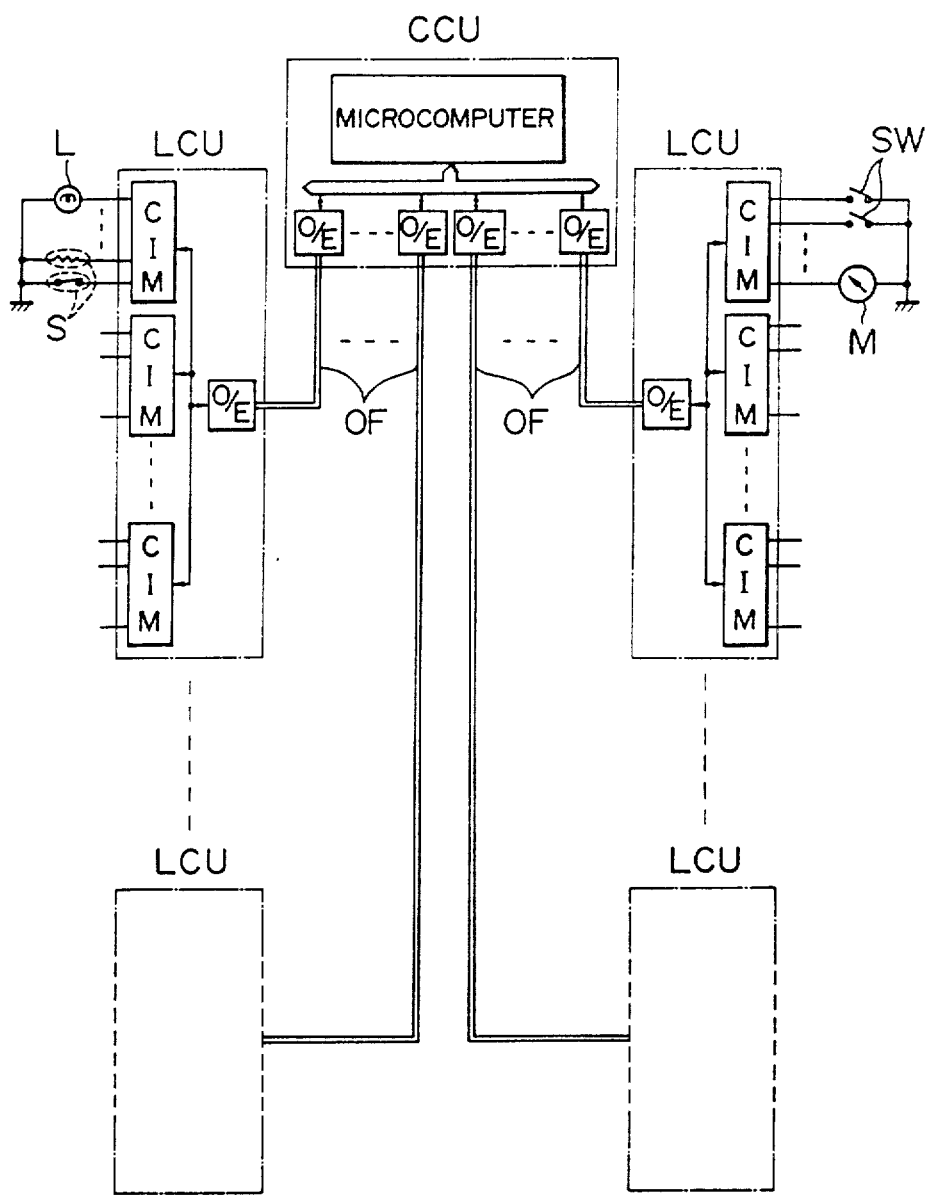
FIG. 2 is a schematic diagram showing the basic details of the collective wiring system.

In the system as shown in FIG. 2, optical fiber cables OF are used as signal transmission lines, and the central control unit CCU and a plurality of local control units LCU are interconnected by a common optical signal channel. The CCU is preferably located near the dashboard of the automobile or other appropriate position and controls the overall system according to the present invention in a manner to be more particularly described later. A necessary number of LCU's are distributedly located near groups of electric devices in the automobile as described with reference to FIG. 1. An opto-electrical converting module 0/E for converting an optical signal to an electrical signal or vice versa is arranged at each coupling point of the CCU or LCU and the optical fiber cable OF. However, the signal transmission line 20 may be any bilateral transmission line and it is not limited to an electrical signal transmission system, but an optical signal transmission system using the optical fiber or any other system may be used. The communication mode is a so-called half duplex mode in which data is alternately transmitted and received between one of the LCUs and the CCU in response to a call from the micom to the selected one of the LCUs.

The CCU has a digital computer (e.g., microcomputer) and a serial data communication function, and each LCU has at least on e communication interface module CIM. The CCU sequentially selects one of the LCUs, exchanges data with the selected LCU and repeats the above operation so that multiple transmission is attained through one channel of optical fiber cables OF and a complex and large scale wiring system of the automobile is simplified.

Because of the multiple transmission in the half duplex mode, the data sent out of the CCU carries a destination address and only one of the LCUs which identifies that the destination address attached to the data received from the transmission line corresponds to the unit address of its own responds to the data. Thus, the data transmission in the half duplex mode is attained by the operation of the LCUs in which only one of the LCUs which identifies its own address from the data sent from the CCU responds to the data to send data of its own to the CCU.

In general operation, the function of the system of FIG. 2 is to monitor the status of input devices, such as switches, sensors and various monitoring devices, and to control various output devices, such as lamps, meters, alarms and various types of indicators, in response to changes in status of the input devices. For this purpose, since an output device and its associated input device are not directly connected to each other on a permanent basis, as in prior art wiring systems, it is necessary for the CCU to not only know how the status of various input devices is changing and what control of output devices is required in response to such detected change in status, but it is also necessary for the CCU to know which input device or devices are assigned to control each of the output devices.

In FIG. 2, for example, it may be that the switch SW1 as an input device is assigned to control the lamp L as an output device, and that the sensor S1 is similarly assigned to control the meter M. Thus, the CCU will have to periodically monitor the status of the switch SW1 and the sensor S1. When the switch SW1 is closed, the CCU will detect this change in status, determine that the lamp L is to be controlled and send a command to the LCU associated with the lamp L to cause the lamp L to be energized. The manner in which this is accomplished in accordance with the present invention will be described in general with reference to FIG. 3.

Figure 3:
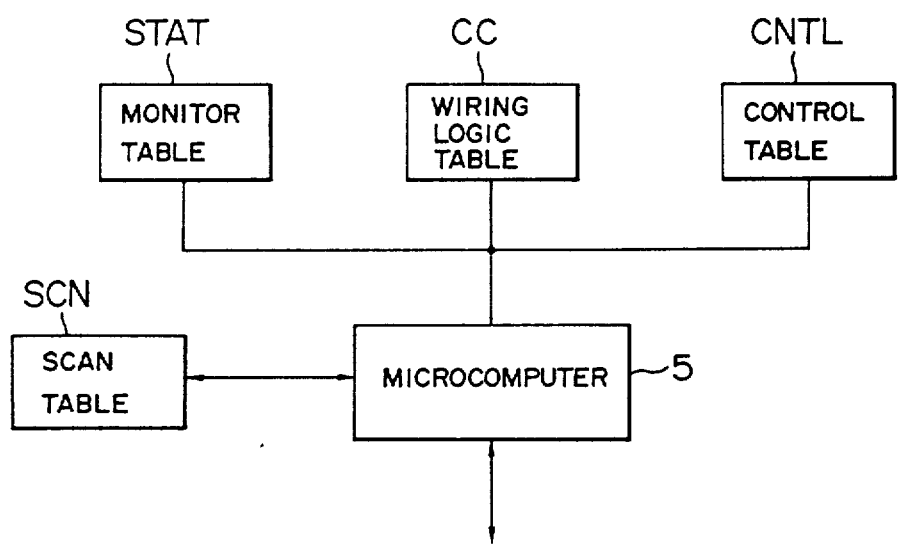
FIG. 3 is a diagram illustrating the various tables in emory which are utilized to control the collective wiring system in accordance with the present invention.

As seen in FIG. 3, the microcomputer 5, which is part of the CCU, has access to various tables in memory to aid it in its control of the system. One of these tables is the scan table SCN which lists the addresses of the CIMs of all of the LCUs in the order in which the CCU is to scan the SIMs to obtain monitor data therefrom or supply control data thereto. A second table is the monitor table STAT, which stores the present status of all input devices associated with the various CIMs. Thus, as the CCU scans the CIMs to obtain the status of the input devices connected thereto, the current status of the input devices is stored in the monitor table STAT. A third table is the control table CNTL, which stores the control or command status of the output devices associated with the various CIMs. Thus, if a particular output device, such as an alarm, should be energized, that control status will be stored in the control table CNTL. The last table is the wiring logic table CC, which stores the logical relationship between the input and output devices in the system.

The basic operation of the CCU in accordance with the data stored in the tables shown in FIG. 3 will be described with reference to the previously mentioned example of the switch SW1 controlling the lamp L in FIG. 2. The microcomputer 5 scans all CIMs in the LCUs according to the order of the addresses stored in the scan table SCN, and when it contacts the CIM to which the switch SW1 is connected, it will receive data indicating the present status of the switch SW1 from the CIM. Assuming that the switch SW1 has been closed since the last time its status was checked by the CLU, this change in status may be detected by comparing the present status as indicated by the data received from the CIM with the previous status of the switch SW1 as stored in the monitor table STAT. The CCU will not only update the status of the switch SW1 in the monitor table STAT at this point, but it will also recognize that the detected change in status may require a change in control of an output device. Thus, the CCU will access the wiring logic table CC to determine which output device is associated with the switch SW1 in the logic control arrangement of the system and it will find that the map L is listed in association with the switch SW1. The CCU will then access the control table CNTL to change the control status of the lamp L to specify that the lamp L should be energized.

In this way, as the CCU periodically scans all of the CIMs it obtains status data from input devices which it uses to update the monitor table STAT and it supplies control commands to control the operation of output devices on the basis of the data stored in the control table CNTL. As a change in status of an input device is detected by reference to the monitor table STAT, the identity of the output device associated with the input device whose status has changed is obtained from the wiring logic table CC and the control status of that output device in the control table CNTL is appropriately changed.

Figure 4:
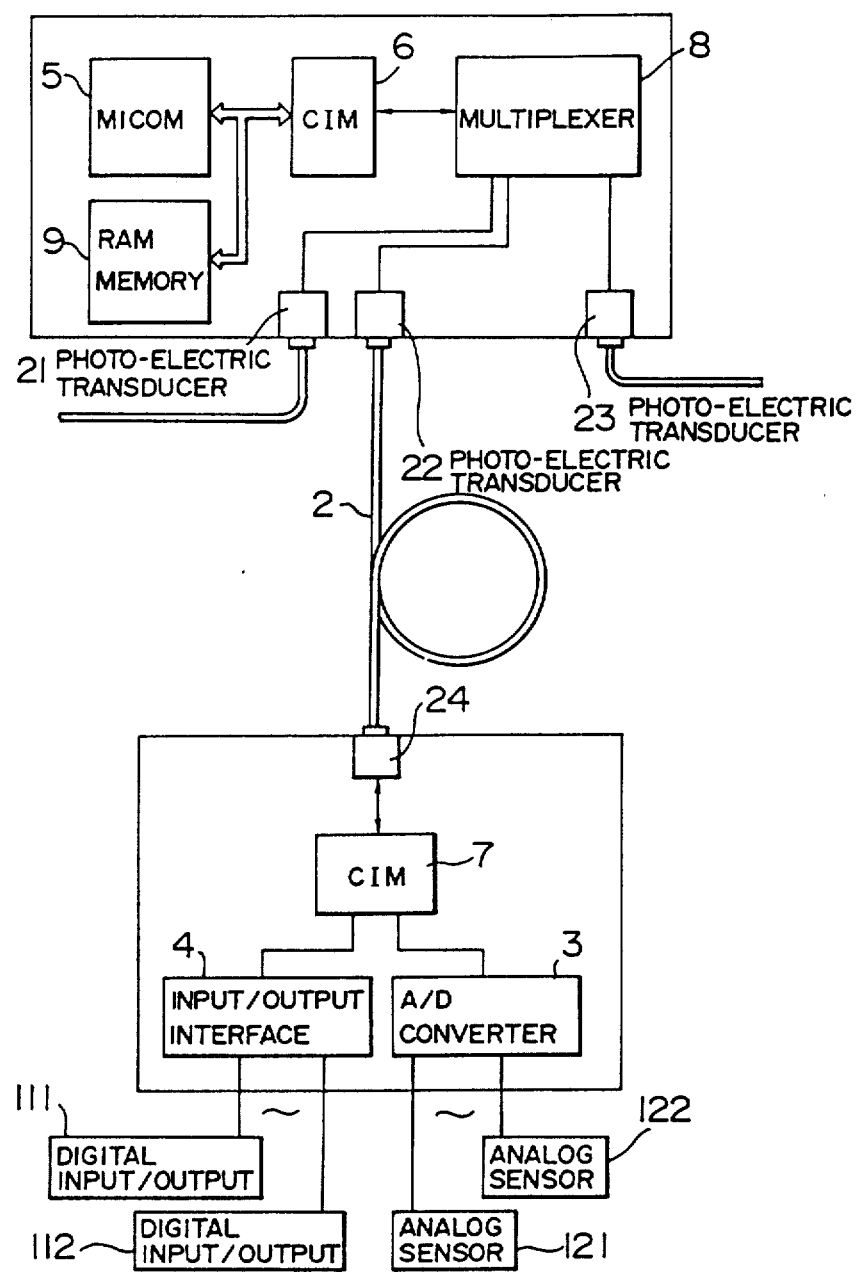
FIG. 4 is a block diagram showing an example of a data transmission system.

FIG. 4 is a block diagram showing details of the CCU and LCU configuration. The CCU requires a high decision and processing capability and therefore includes the microcomputer 5. A signal transmission control circuit (CIM) 6 sends the parallel control data produced by the microcomputer 5 by converting it into serial control data. Also, it subjects the received data to serial-to-parallel conversion, and when upon receipt of error-free data, functions to apply an interruption demand to the microcomputer 5. The CCU also includes a multiplexer 8 for selecting an LCU for transmission, photoelectric transducers 21 to 23 for photo-electric conversion of the signals transmitted between the CCU and various LCUs, and memory unit 9 for storing received and transmitted data.

On the other hand, the LCU includes a photo-electric transducer 24, a CIM 7, an input-output interface 4, and an A/D converter 3. The A/D converter 3 is connected to analog sensors 121 to 122 and the I/O interface 4 is connected to digital inputs/outputs 111 to 112.

Figure 5:
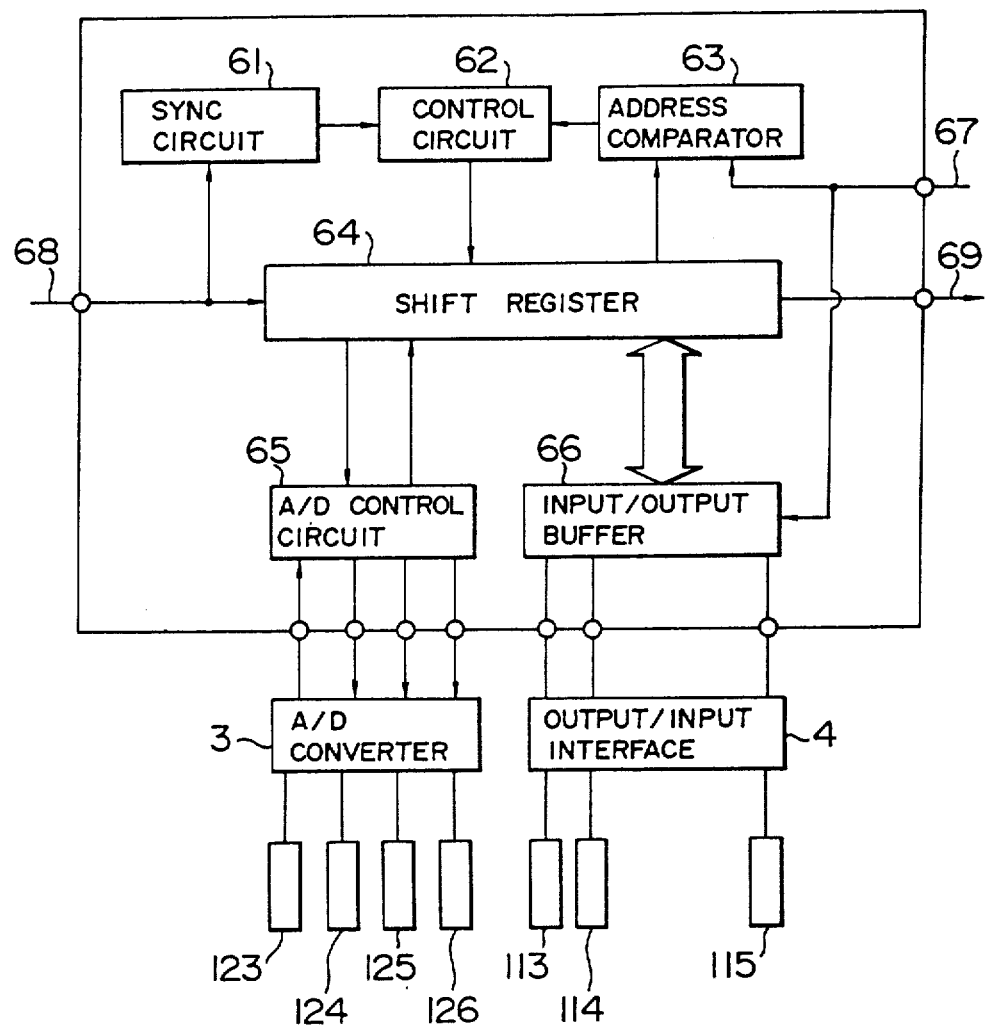
FIG. 5 is a schematic diagram showing the circuit configuration of a typical CIM.

FIG. 5 is a block diagram showing the CIM, which is an essential component part of the collective wiring system. The CIM is classified roughly into a control section and an interface section. The control section includes a sync circuit 61 for synchronizing the data received on the data input line 68 to an internal clock signal, a control circuit 62 for controlling interrupts (when used in the CCU) or data transmission error, and an address comparator 63 for comparing the address supplied from the line 67 with an address indicating a destination included in the received data. The interface section includes a shift register 64 for serial-parallel conversion, an A/D converter control circuit 65 for controlling the A/D converter 3 for the serial input, and an input-output buffer 66 connected to the input-output interface 4, of which the direction of input or output changes with the address input of the line 67.

Upon receipt of data from line 68, it is converted into parallel data at the shift register 64. During the receiving process, the data is checked for a transmission error, so that upon completion of receipt of the data, the address input from the line 67 is compared with the address in the received data, and if the two addresses are not inconsistent, the received data is transferred to the input-output buffer 66 to control the output portion of external digital input-outputs 113 to 115. During data transmission from the CIM, on the other hand, data in the A/D converter control circuit 65 and the data in the input-output buffer 66 are transferred to the shift register 64, and this data is transmitted from line 69 toward the CCU by the shift clock generated in the control circuit 62. Instead of the CIM used in the LCU to handle analog data shown in FIG. 5, a CIM may be used either to handle the digital input-output of data alone according to the address given from line 67 or it may be used for interface with the microcomputer in the CCU.

Figure 6:
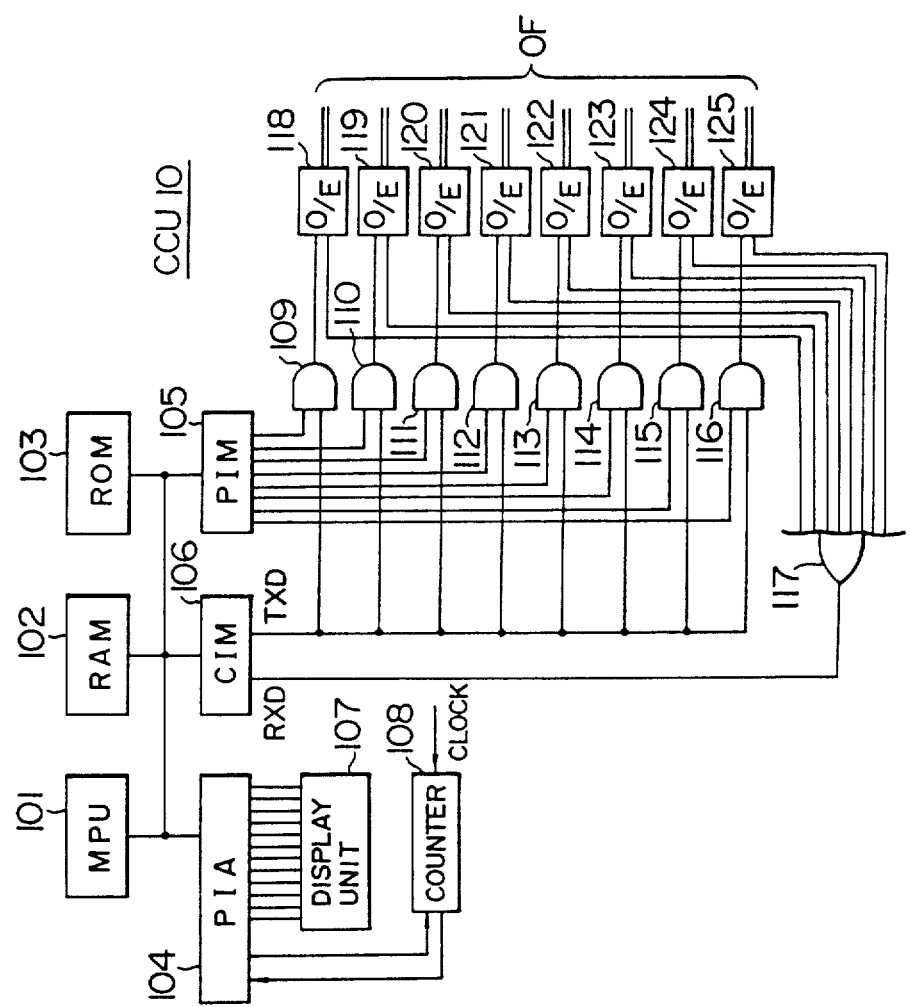
FIG. 6 is a schematic block diagram showing the circuit configuration of the CCU.

FIG. 6 shows an embodiment of the CCU 10, comprising a microprocessor (hereinafter referred to as the "MPU") 101, a RAM 102, a ROM 103, a first peripheral interface adapter (hereinafter referred to as PIA) 104, 105, a second PIA 106, a display unit 107, a timer counter 108, gates 109 to 117, and O/Es 118 to 125.

With eight O/Es 118 to 125, eight LCUs can be controlled through the optical fiber cable OF. For this purpose, the PIA 105 controls the gates 109 to 116, thereby to determine any of the O/Es 118 to 125 to which the transmission signal TXD from CIM 106 is applied as transmission data, while at the same time receiving the data from each LCU through the gate 117 at CIM 106 as the receiving signal RXD.

The display unit 107 is for indication of the operation of the CCU 10, and is connected through PIA 104 to MPU 101. The timer counter 108 is connected to the control input terminal of the PIA 104 and, after being reset by the reset signal applied thereto from the PIA 104, has the function to count a predetermined length of time and send an interruption signal to PIA 104.

Figure 7:
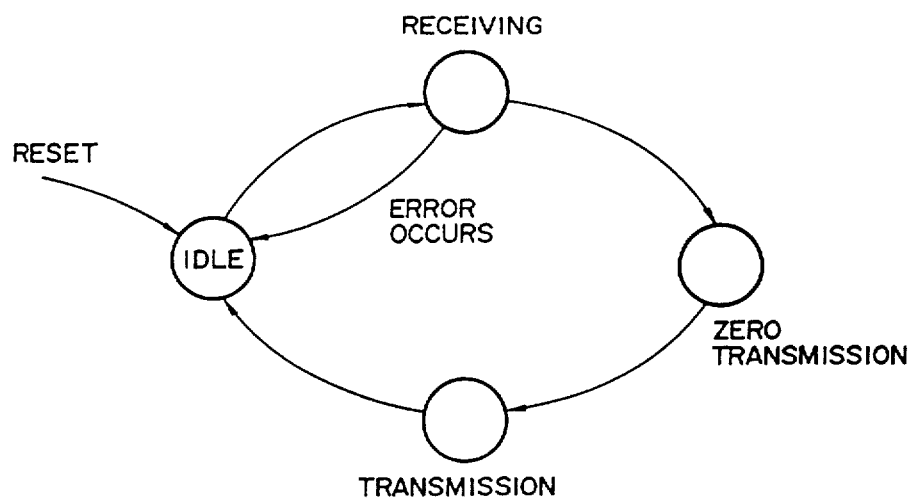
FIGS. 7 and 8 are diagrams showing the condition transition of the CIM.

FIG. 7 is a diagram showing the condition transition of the CIM used in the LCU. When it is reset, this CIM enters an idle state and remains in a stand-by condition for receiving data. Upon receipt of a start bit at the top of received data, the receiving mode is entered to check the address and for any transmission error while the data is in receipt. In the presence of an error, the CIM returns to the idle state and waits for the next data. In the absence of an error, on the other hand, a zero transmission mode is entered to transmit "0" in the number of bits required for transmission error detection. In the next transmission state, transmission data is transmitted and the CIM returns to the idle state to complete a cycle of transmission.

Figure 8:
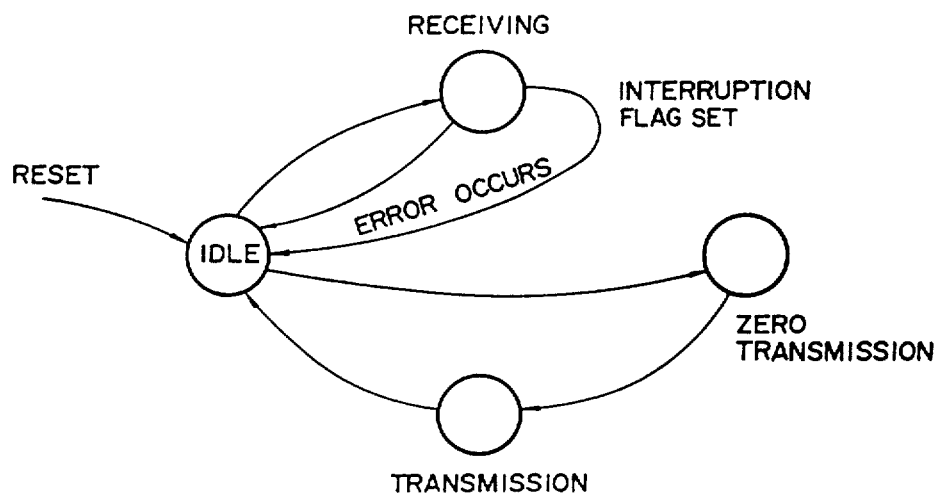

FIG. 8 shows a transition of CIM conditions as it is used in the CCU. First, the CIM is reset in the idle state. When data is written by the microcomputer in the shift register 64 in the CIM, transmission is started. The state is transferred from idle to zero transmission to transmission, followed by the returning to the idle state to wait for the receipt of reply data in response to the transmission data. In the presence of a transfer error, the idle state is restored. Since the received data in the CIM in the CCU has no reply to the transmission data, no address check is conducted. Upon receipt of data free of error, an interruption demand flag in the microcomputer 5 is set, followed by the returning of the CIM to the idle state to complete a transmission cycle. The interruption demand may be masked by software.

Figure 9A:
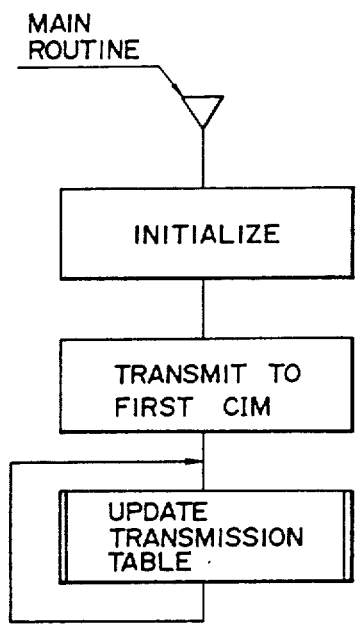
FIGS. 9a-9c are flowcharts illustrating the various routines in the operation of the system according to the present invention.
Figure 9B:
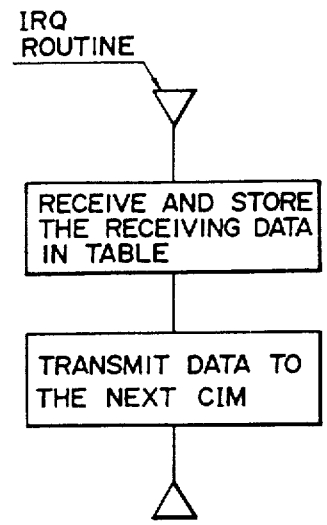
Figure 9C:
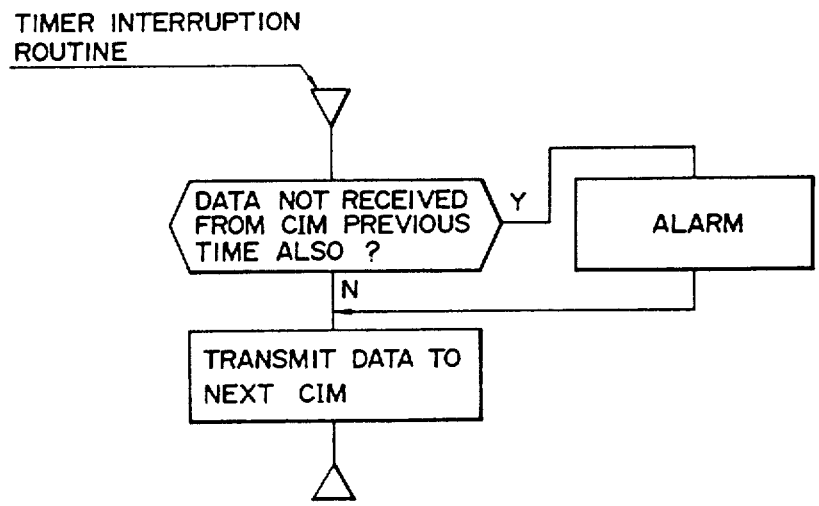

FIGS. 9a-9c are flowcharts showing a method of control for a collective wiring system of star network configuration as shown in FIG. 2 and having a CCU and LCU configuration as described with reference to FIG. 5. First, in the main routine of FIG. 9a, the memory and timer are initialized to actuate transmission, that is, to transmit data to the first CIM. After actuation of transmission, the transmission table for storing transmission data is updated repeatedly. The received data is processed against the transmission data by the IRQ (interrupt) routine of FIG. 9b. Control is transferred to the IRQ routine by an interruption demand flag produced when data is received by the CIM. In the IRQ routine, the received data is collected and stored in the receiving table, so that data is received at the next CIM and then the process is returned from IRQ routine to the main routine.

If data is normally transmitted, the main routine and IRQ routine alone enable the collective wiring system to display its function. If the transmission or received data has an error for some reason or other, however, the transmission is stopped and not resumed. This inconvenience is prevented by a timer interruption routine. In this routine, utilizing the fact that the time from receipt of data by the CIM in the LCU to the time of transmission thereof is constant, a time longer than that fixed time is set in the timer, so that when the time after transmission by the CCU coincides with the set time, the timer interruption routine of FIG. 9c is executed. In the case where a succession of two data transmissions fails to be received from the same CIM, a buzzer or lamp is actuated as an alarm while at the same time transmitting data to the next CIM to continue transmission.

Figure 10:
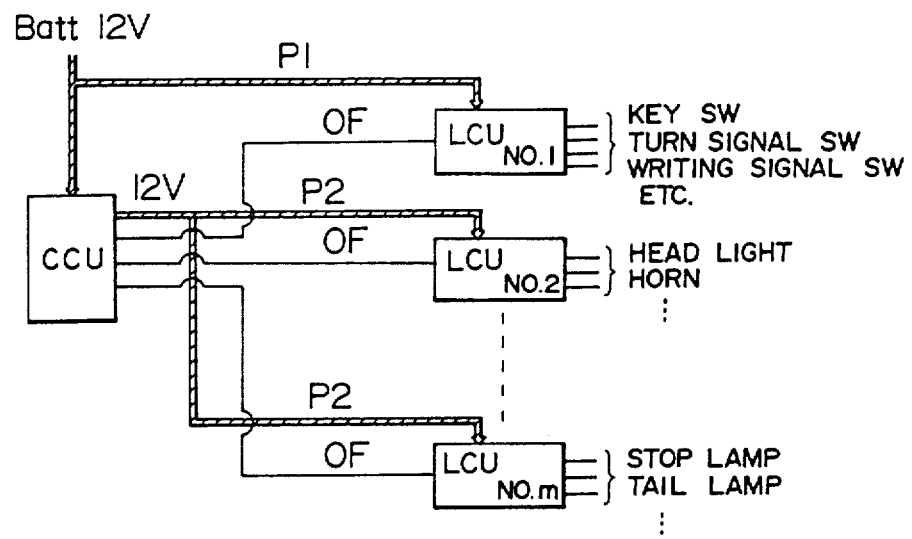
FIG. 10 is a diagram for explaining the control of the supply of power to the collective wiring system.

Now, FIG. 10 shows the condition in which power is supplied to the CCU and each LCU. The power line P1 for the CCU and a specific one of the plurality of LCUs, that is LCU No. 1, is directly connected to the battery and thus is always supplied with power even when the automobile engine is stopped, while the power line P2 for the other LCUs (Nos. 2 to m, where m is the total number of CCUs) is connected via the CCU to the battery. As a result, only when a specific switch, such as a key switch, turn signal switch or a lighting switch is turned on will all the LCUs be supplied with power, thereby minimizing the power consumption while the engine is stopped.

As described with reference to FIG. 3, according to the present invention, the CCU 10 includes four types of control tables, that is, a communication scan table (hereinafter referred to as SCNTBL), a connection control (wiring logic) table (hereinafter referred to as CCTBL), a status (monitor) table (hereinafter referred to as STATTB) and a command control table (hereinafter referred to as CNTLTB). These tables will be described in detail to provide a more clear understanding of the present invention.

The scan table SCNTBL is stored in a predetermined area of ROM 103 and is used for determining the CIM to which data is to be transmitted at the next transmission timing and the LCU containing the particular CIM. The table SCNTBL has written therein a plurality of LCU and CIM addresses sequentially in the order of transmission.

Figure 11:
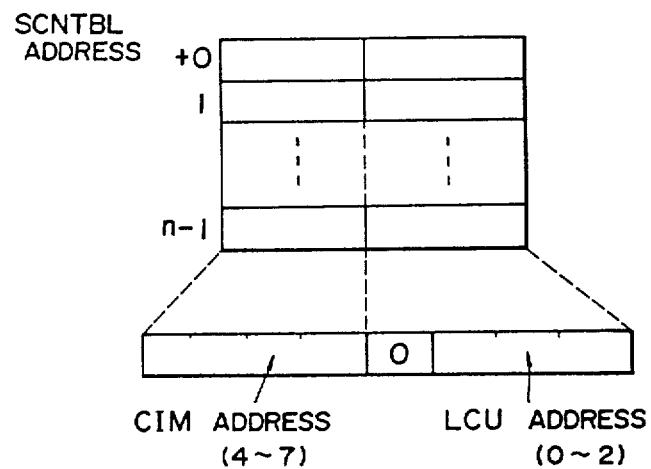
FIG. 11 is a diagram illustrating the format of the scan table.

FIG. 11 shows an embodiment of this scan table SCNTBL, which has a 1-byte memory area at the n addresses from +0 to n-1, where n is the total number of CIMs, and each address of the table SCNTBL contains the address of each LCU at the lower three bits and the addresses of each CIM contained in this LCU at the higher four bits. In this embodiment, therefore, assuming that the number of LCUs is m, the maximum value of m is eight and 16 addressable CIMs are possible in each LCU. This scan table SCNTBL is searched in the order of its addresses and gives the order of data transmission from the CCU to each CIM.

The connection table CCTBL, on the other hand, describes the relationship between the terminals of a CIM from which status data is received and the terminals of a CIM to receive data in response thereto, and like the scan table SCNTBL, is located in a predetermined area of ROM 103. In this way, the collective wiring system has a configuration which is determined by the data stored in the table CCTBL, such that the conditions for data transmission to each CIM terminal are determined by the conditions of logic sum or product against a single or a plurality of other terminals, and are not changed during system operation. The conditions of connection between these terminals are tabulated in advance, so that the required terminal to which data is to be transmitted is immediately determined only by searching the connection table CCTBL at the time of data entry from a given terminal.

Figures 12, 13:
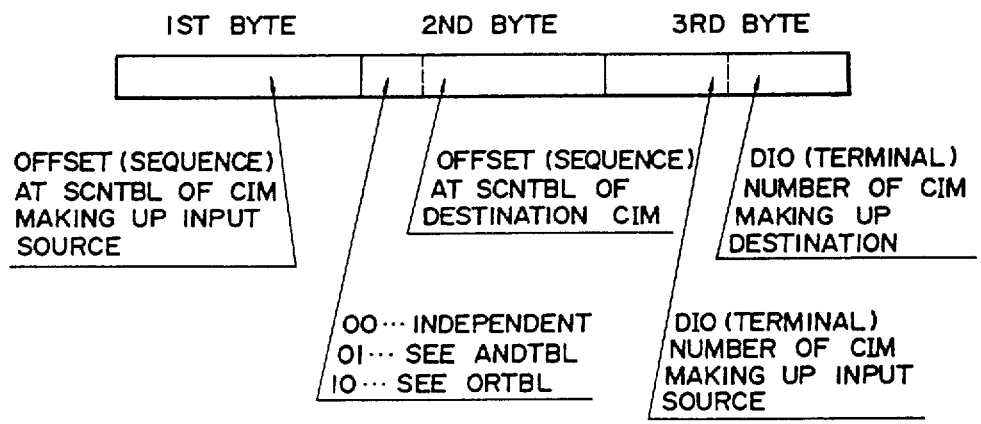
FIGS. 12-14 are diagrams illustrating the format of the connection table.
Figure 14:
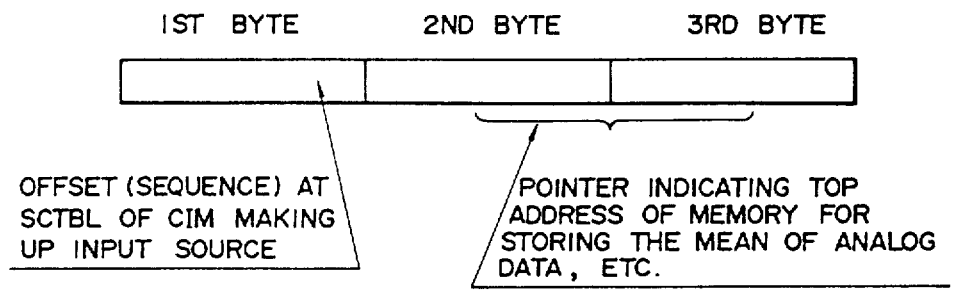

FIG. 12 shows an embodiment of the connection table CCTBL including an address portion UCTBL representing the conditions of connection which are unconditional, address portions ORTBL and ANDTBL containing therein OR and AND conditions, and an address portion ADTBL containing conditions for transmission corresponding to analog data, each address being comprised of three bytes as shown in detail in FIGS. 13 and 14. FIG. 13 concerns the digital data in address portions UCTBL, ORTBL and ANDTBL, and FIG. 14 shows the analog data in address portion ADTBL of the table CCTBL.

In the table CCTBL, three bytes are allotted to indicate each relationship of connection. The first byte contains the addresses of the storage locations in the scan table SCNTBL which the CIMs are associated with and to which data is to be transmitted. The second byte contains the addresses of the storage locations in the scan table SCNTBL of the associated CIMs connected to one or more output devices and to which data is to be transmitted. Since the addresses typically do not require eight bits, the bit 7 and bit 6 of the second byte include information as to whether the input is AND-related or OR-related. The third byte contains information as to the identity of the input-output terminal of the CIM to which the input device is connected and the identity of the input-output terminal of the CIM to which the associated output device is connected.

| 01 | 05 | 93 | for instance, indicates that a switch connected to the input-output terminals 9 of the CIM having address 1 in the scan table SCNTBL (to which data is transmitted first) actuates a unit connected to the input-output terminal 3 of the CIM having the address 5 in the scan table SCNTBL (to which data is transmitted fifth).

| 01 | 43 | 62 | on the other hand, indicates that the output un-it connected to the input-output terminal 2 of the third CIM to which data is transmitted is not to be actuated as long as the conditions for logic product of a plurality of inputs is not established (as indicated by the number 4 in the left part of the second byte). The input connected to the input-output terminal 6 of the first CIM to which data is transmitted is one of them.

The monitor table STATTB, on the other hand, is a data table set in a predetermined area of RAM 102, and comprises a receiving (monitor) table for storing input data from each CIM, and the table CNTLTB is also set in RAM 102 and comprises a transmitting (control) table for storing the transmission data applied to each CIM. The data stored in these two tables enables the CCU to grasp the system condition instantaneously, thereby permitting higher-speed processing.

Figure 15:
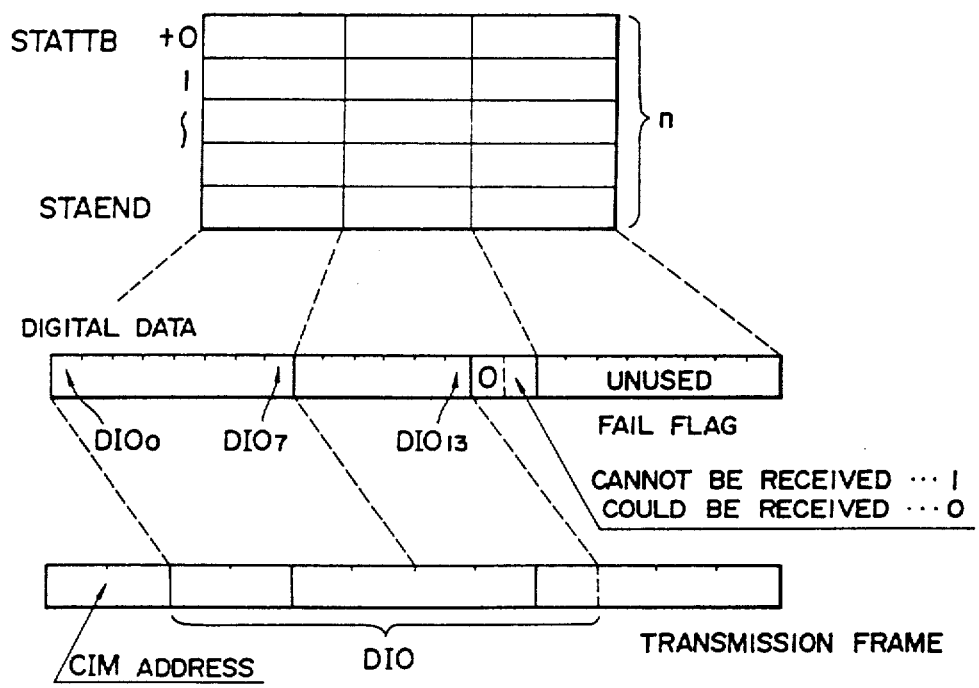
FIGS. 15 and 16 are diagrams illustrating the format of the status and control tables.
Figure 16:
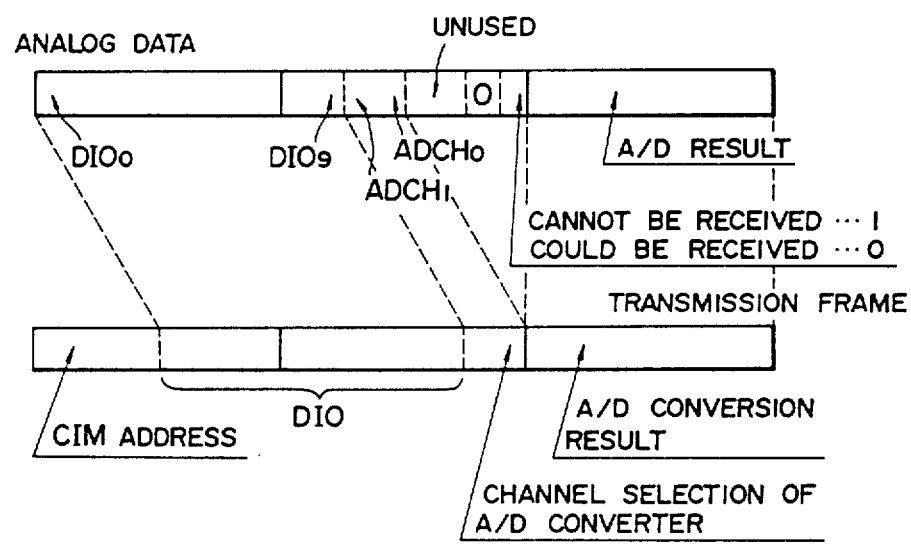

FIG. 15 shows an embodiment of the table STATTB relating to the case of digital data, in which two bytes are provided in each address corresponding to DIO of the transmission frame (which represents a terminal of the I/O buffer of the CIM that is, a terminal where data is to be exchanged as explained with reference to FIG. 5). In relation to analog data, on the other hand, a configuration as shown in FIG. 16 is provided. The configuration of the control table CNTLTB is the same as that of the monitor table STATTB.

As already explained, each time of data transmission between the CCU and a given LCU, new receiving data (corresponding to one CIM) is supplied to the CCU. Since the receiving data preceding the currently supplied receiving data is stored in the monitor table STATTB, comparison of a new receiving data with the data previously stored in the STATTB makes it possible to easily determine whether the data has undergone a change. In the alternative, it is possible to simply write the new status data into the monitor table STATTB and then compare this new status data with the old status data stored in the control table CNTLTB. If a change in the receiving data is found, the changed data bit is detected by exclusive logic sum and the data bit for the output device corresponding to the input device in the CNTLTB is inverted for each changed bit. The correspondence between the data bits for the STATTB and the CNTLTB under this condition is given by the connection table CCTBL, and therefore the data bit for transmission can be easily determined by searching this table CCTBL.

Figure 17:
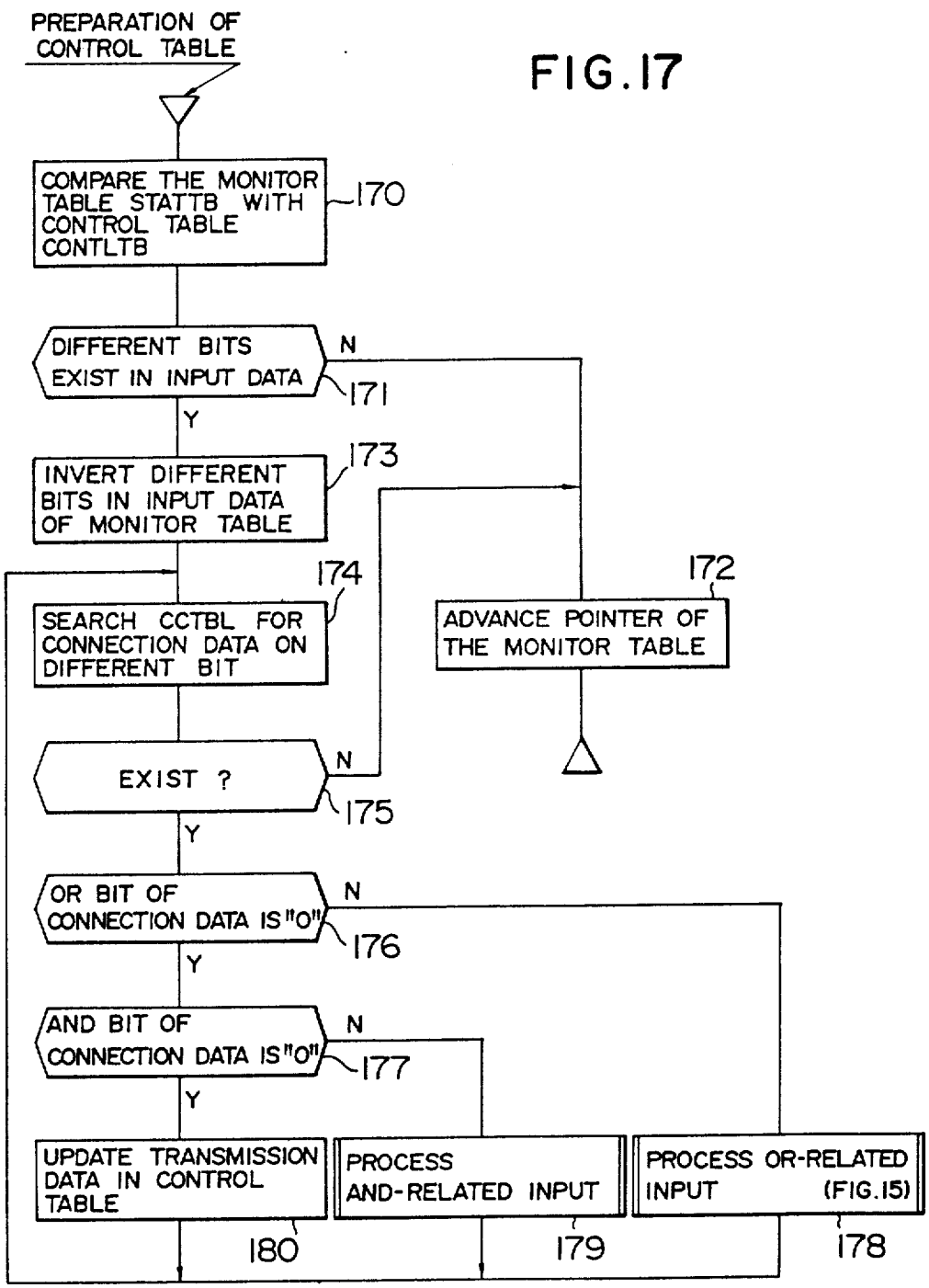
FIG. 17 is a flowchart illustrating the procedure involving the preparation of the control table.

FIG. 17 is a flowchart showing a routine for updating the control table CNTLTB by use of the connection table CCTBL configured as shown in FIG. 12. The simplest method of updating a transmission table is to check input states sequentially, so that if "1" in involved, a corresponding output is rendered "1", while if "0" is involved, the output is made "0". In the case where there are a number of relationships of input-output connection, however, a problem of response time occurs. In the routine of FIG. 17, therefore, taking advantage of the fact that an input keeps the previous state and rarely changes in the case where a collective wiring system is aimed at a general wiring system, the input is checked for a change, and if there is any change, the state of the corresponding output is inverted.

First, in step 170 the monitor table STATTB containing the latest data is compared with the control table CONTBL containing the previous input states to check for a change in input. In the absence of any change (step 171), the pointer of the monitor table STATTB is advanced by one step (step 172). If there is any change (step 171), on the other hand, the input bit for the corresponding output device in the control table CNTLTB is inverted (step 173) for the next check for a change to make it coincide with the status indicated by the monitor table STATTB. Then, the connection for the input changed is found out from the connection table CCTBL (step 174), and OR and AND bit are checked (steps 175–177). If they are "1", the processing is made accordingly (steps 178 and 179). If they are "0", the output bit of the control command data is inverted (step 180) on the basis of the connection data that has just been found out from the connection table CCTBL. The connection of an output to the input changed is not always one, and therefore any connection is found out from the connection table CCTBL again for similar processing. If the connection data from the input changed ceases to exist in the control table CCTBL, the pointer of the monitor table STATTB is advanced by one (step 172).

Figure 18:
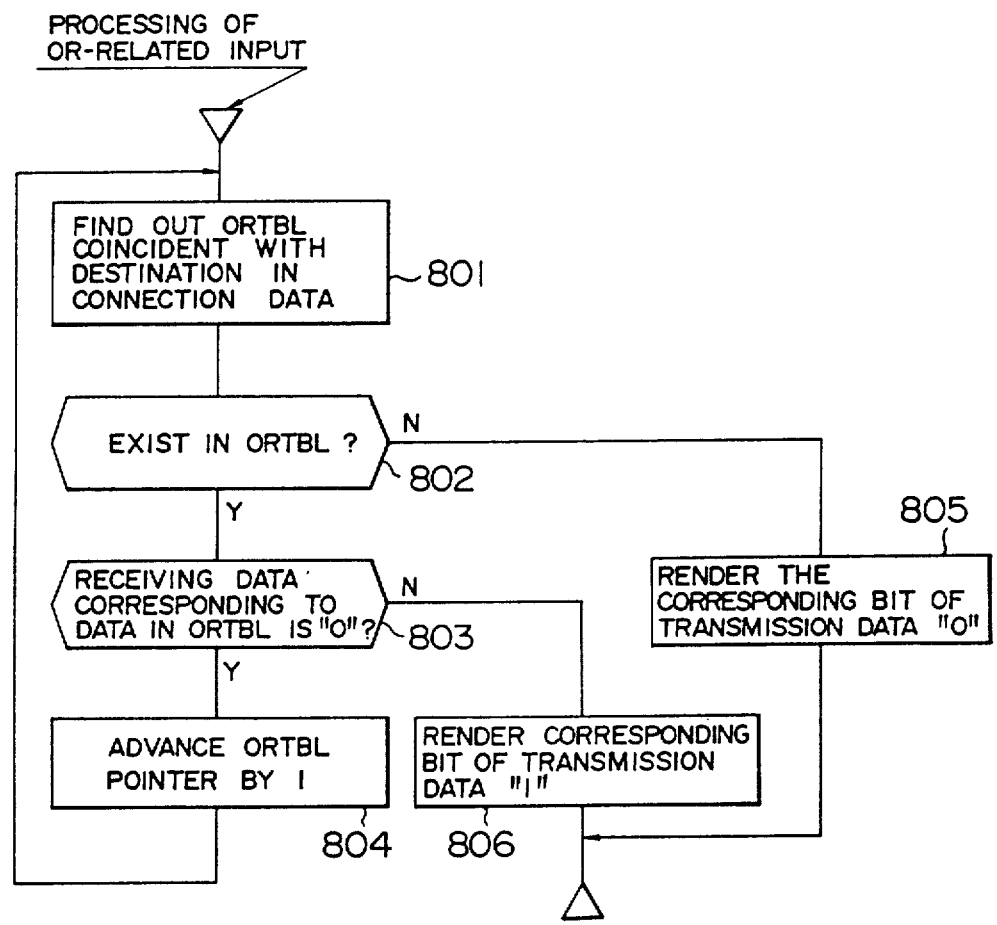
FIG. 18 is a flowchart illustrating the processing of OR-related inputs.

A method of processing OR-related inputs is shown in FIG. 18. In this processing, only those connections in which an OR bit is "1" in the control table CCTBL are collected into a table portion as an OR table ORTBL.

The configuration of the OR table ORTBL is the same as the configuration of control table CCTBL of FIG. 12 in which the OR bit and AND bit are made "0". With an eye on the output for the input changed, the connection data relating to the particular output is found from the OR table ORTBL (step 801), and the input state indicated by that connection data is checked, so that if it is "1", the bit corresponding to the output unit of the transmission table is rendered "1" to end the process (step 806). If the input state is "0", on the other hand (step 803), the next connection data is found from the OR table ORTBL (step 804) to perform a similar processing. If it is impossible to find the connection data for the output from the OR table ORTBL (step 802), the bit corresponding to the output unit in the transmission table is rendered "0" to end the process (step 805).

Figure 19:
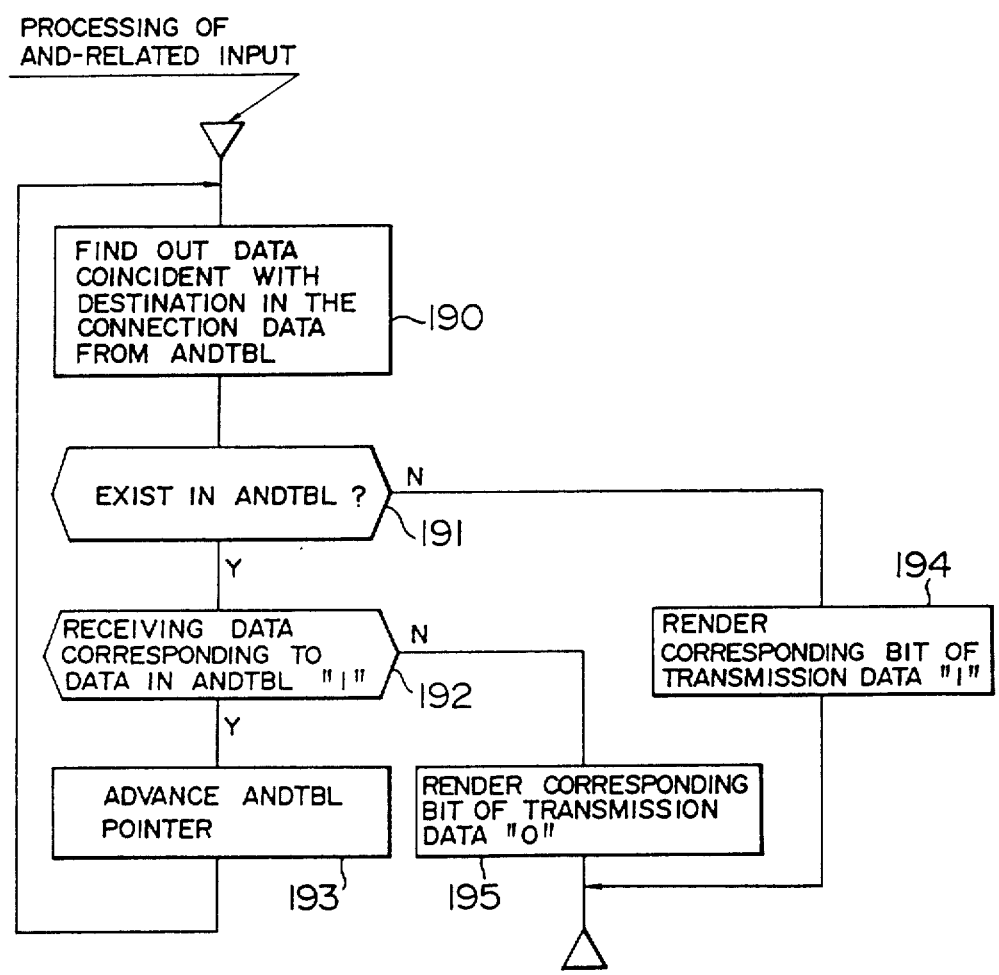
FIG. 19 is a flowchart illustrating the processing of AND-related inputs.

FIG. 19 is a flowchart of a routine for processing the AND-related inputs. This is substantially identical to the routine for processing OR-related inputs shown in FIG. 18 in which "1" and "0" are replaced with each other. In this case, with an eye on the destination of the connection data (in the control table CCTBL) corresponding to the input changed, AND-related inputs are found from the AND table ANDTBL to check whether the value is "0" or not. If any one of them is "0", "0" is written in the transmission table, while only when all inputs are "1", "1" is written in the transmission table.

According to the collective wiring system of the present invention, a multiplicity of AND-related inputs and OR-related inputs existing in an automotive vehicle are processed by software in the CCU, and therefore a switch, even if distant, may be connected to the nearest LCU, without any addition of hardware, thus reducing the size of the collective wiring system. Also, these control processes may be performed by a control system using a table of data in memory, so that any difference in the connections of input and output caused by a model change or the like may be met easily only by changing the table.

The operation of this embodiment will now be explained. In the system according to this embodiment, data transmission is performed by remote operation of each CIM from the CCU by way of the transmission system, and for this purpose, each CIM is provided with an address, thereby enabling the CCU to exchange data with each CIM in a desired sequence. This order of transmission is determined by the scan table SCNTBL in FIG. 11, and for this purpose, at each time of data transmission to each CIM, the MPU 101 increments the pointer of the scan table SCNTBL to indicate the next CIM to which transmission is to be made. The responsiveness of this embodiment therefore, is determined by the time required for the pointer making a round, that is, the time required for all the CIMs to complete one transmission each.

In this embodiment, it takes about 600 μs before the CCU sends the transmission data to a given LCU and receives the receiving data from a given CIM in the particular LCU. In order to shorten the response time sufficiently, taking this transmission time into consideration, this embodiment includes the restart process RESTART shown in FIG. 20 in the main routine, which is combined with the timer interruption process TOCFI shown in FIG. 21, to make the framework of the whole process.

Figure 20:
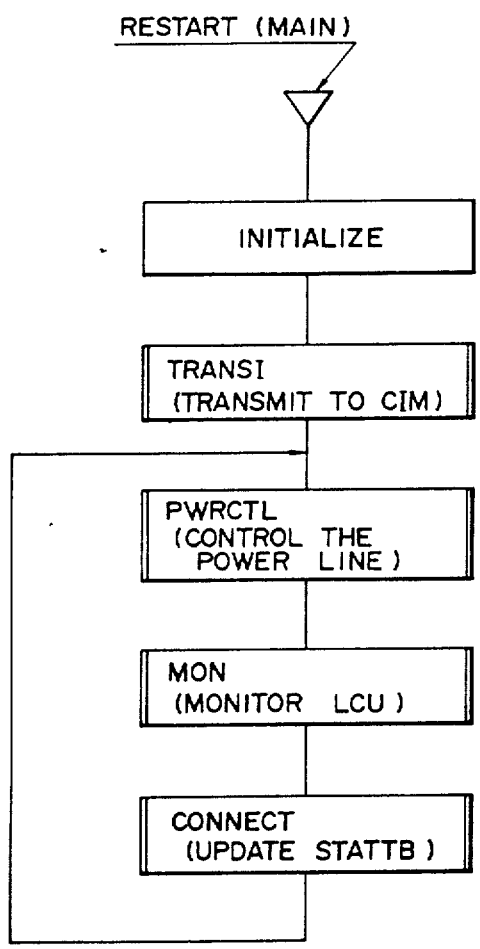
FIG. 20 is a flowchart illustrating the restart routine.
Figure 22:
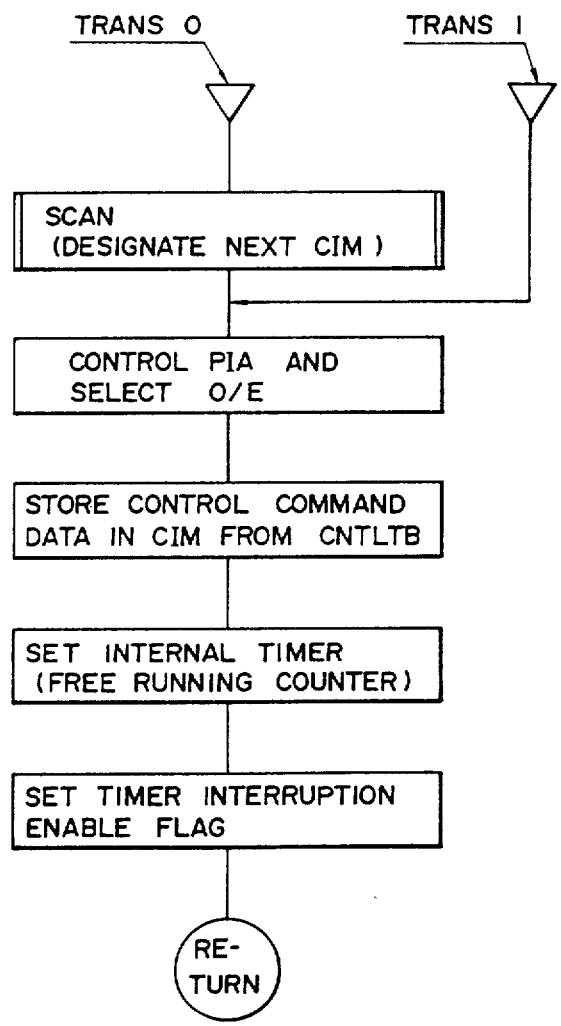
FIG. 22 is a flowchart illustrating the TRANS routines.
Figure 24:
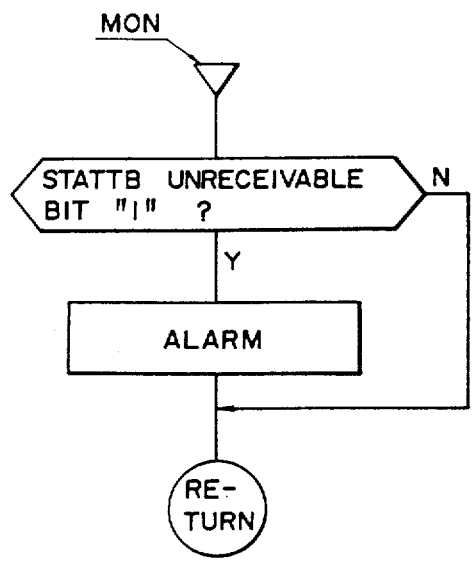
FIG. 24 is a flowchart illustrating the MON routine.
Figure 25:
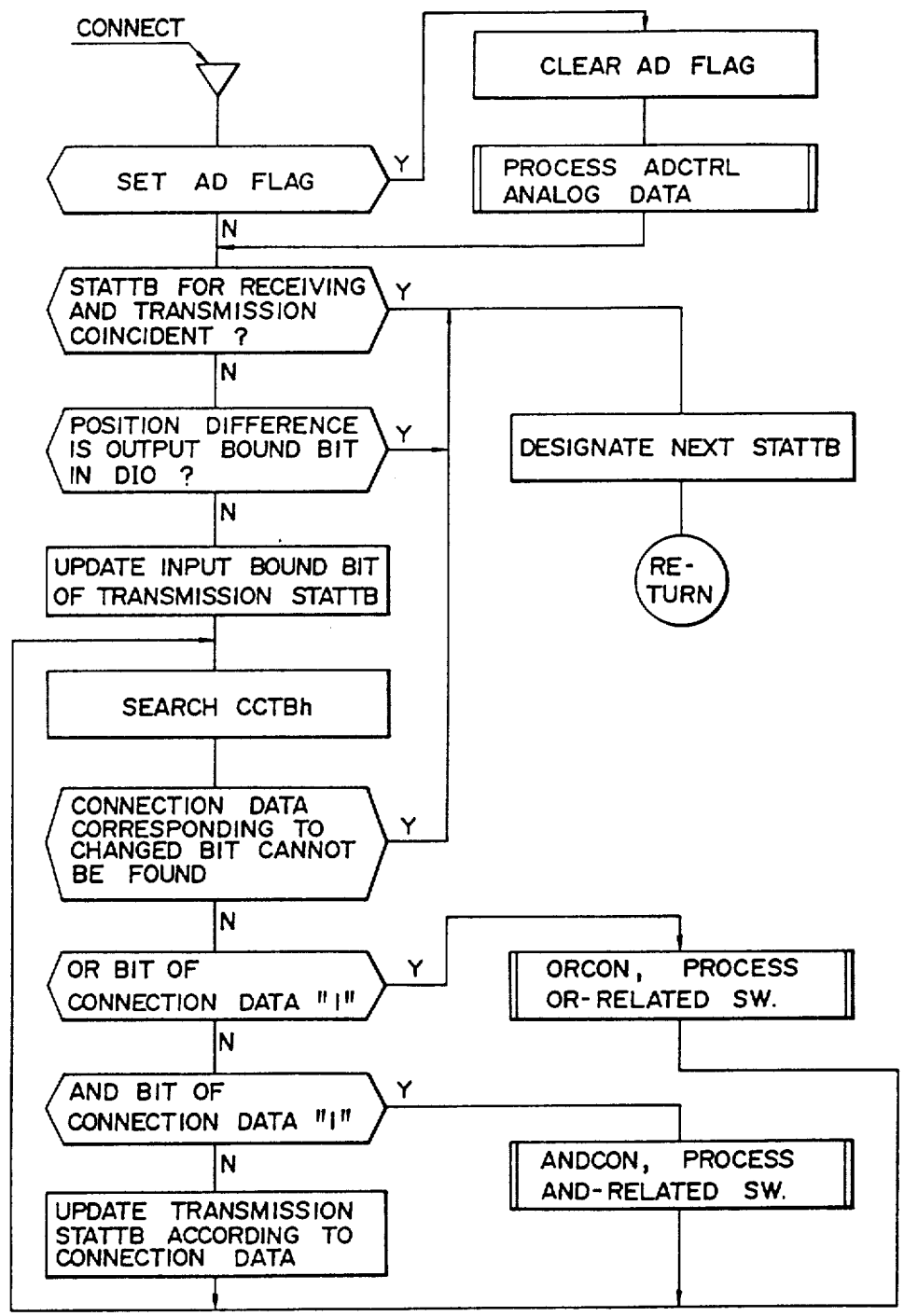
FIG. 25 is a flowchart illustrating the CONNECT routine.

First, the process of FIG. 20 is executed from the beginning when the master reset switch is operated, and after initialization, TRANS1 is executed once to effect transmission to a CIM. Details of this TRANS1 process are shown in FIG. 22. After this TRANS1 process, the normal processing routine is entered to repeat PWRCTL and MON processes as well as the CONNECT process. Details of these processes are shown in FIGS. 23, 24 and 25, respectively.

Figure 21:
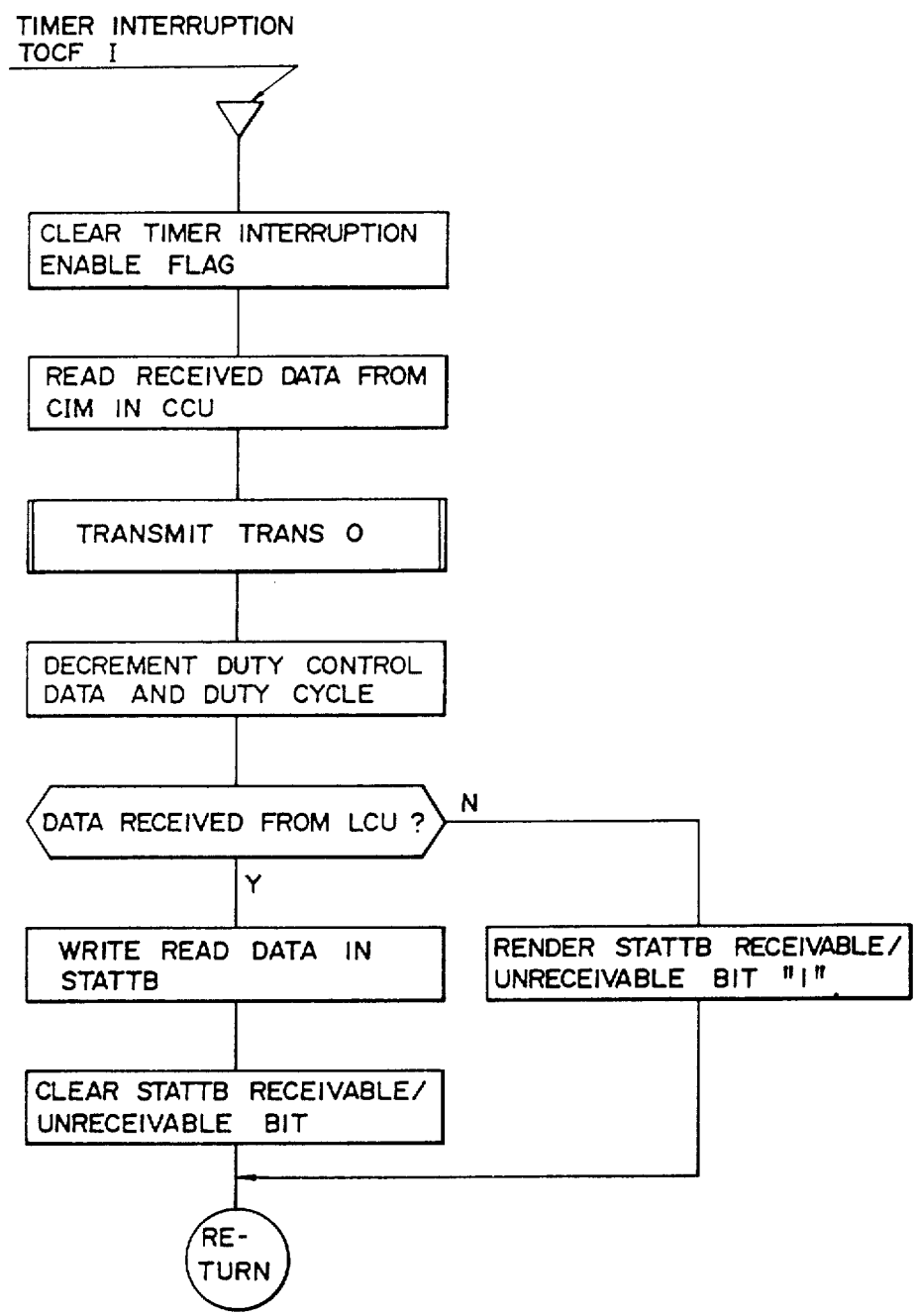
FIG. 21 is a flowchart illustrating the timer interruption routine.
Figure 23:
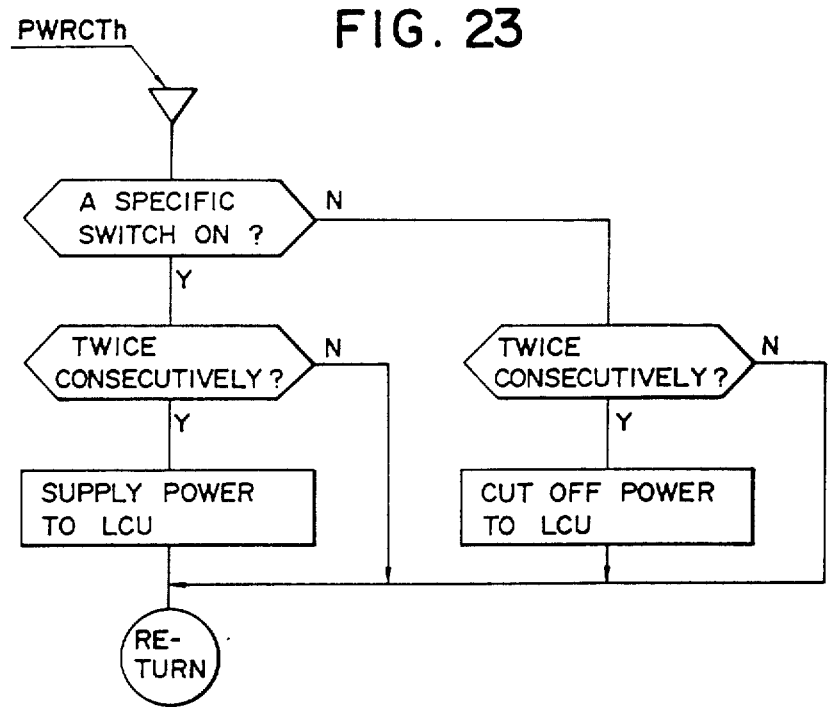
FIG. 23 is a flowchart illustrating the power control routine.
Figure 26:
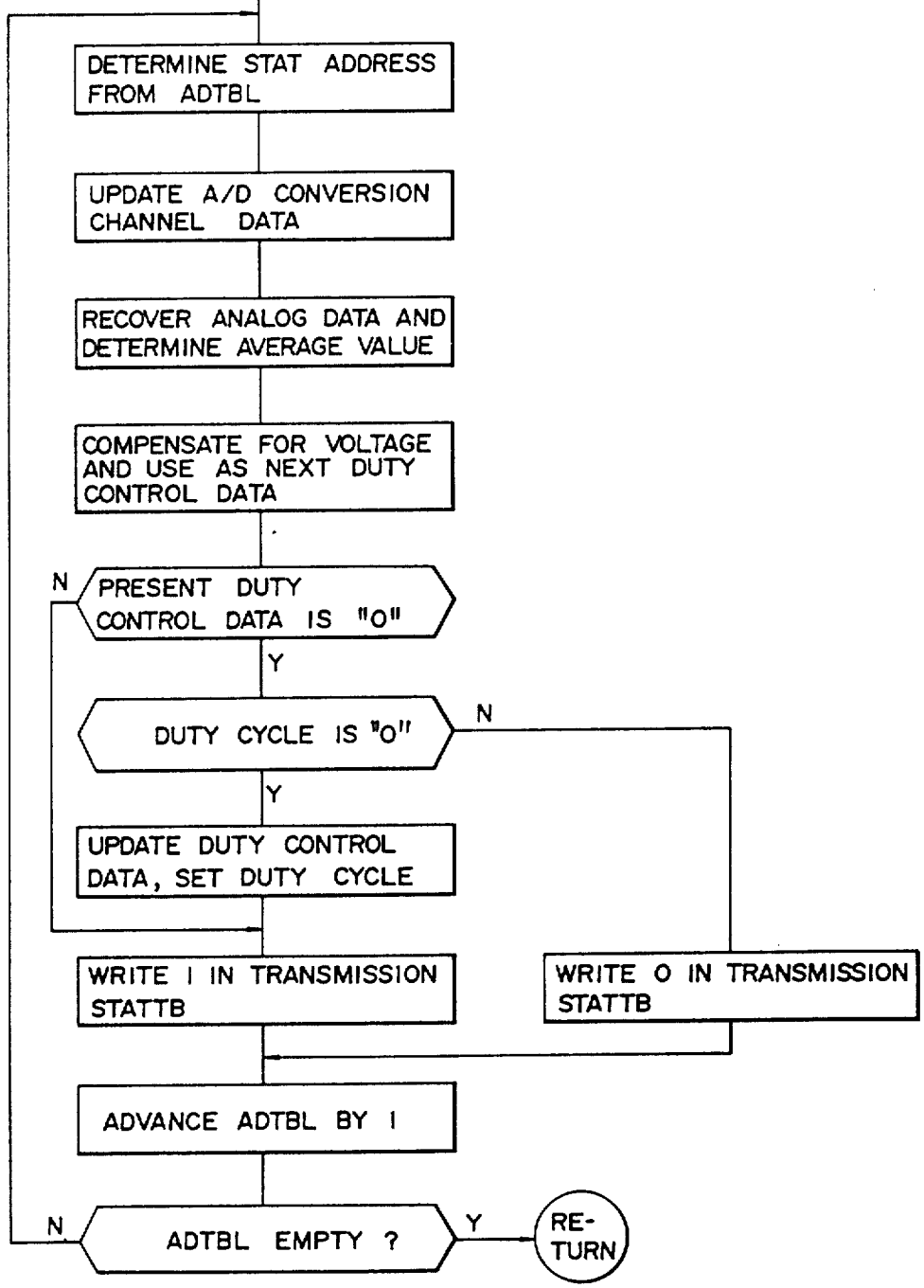
FIG. 26 is a flowchart illustrating the analog data control routine.
Figure 27:
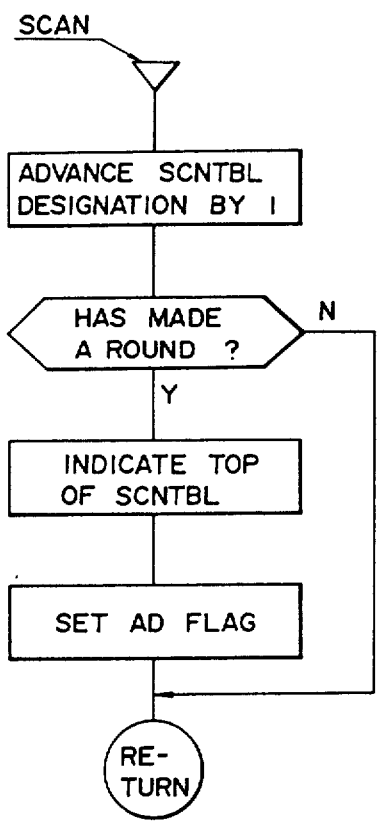
FIG. 27 is a flowchart illustrating the SCAN routine.

The PWRCTL process shown in FIG. 23 is for controlling the power supply to LCUs Nos. 1 to m as explained with reference to FIG. 10. The MON process of FIG. 24, on the other hand, is a process in which the fail flag written in the table of FIG. 15 is utilized whereby when a CIM appears to which a predetermined data has ceased to be supplied, an alarm is issued. The CONNECT process of FIG. 25 is for updating the control table CNTLTB by use of the connection table CCTBL, in which the ORCON and ANDCON processes are employed, as shown in detail in FIGS. 18 and 19, respectively. The ADCTRL process, which is shown in detail in FIG. 26, is not related to this embodiment and therefore will not be explained. On the other hand, TRANS0 in the timer interruption process TOCFI of FIG. 21 is shown in FIG. 22, the process SCAN of which is shown in detail in FIG. 27. To facilitate the understanding of the operation of the aforementioned embodiment, a more specific embodiment will be described. First, by way of explanation, assume a system shown in FIG. 28 comprising three LCUs each having one CIM. Also assume that LCU 1 is mounted in the engine compartment of an automobile and has a CIM of address 7, LCU 2 is located in the trunk of the same automobile and has a CIM of address 8, and LCU 3 is provided near the driver's seat and has a CIM of address 3. In accordance with these assumptions, the DIO terminals of the CIMs in these LCUs are assigned and set as shown in FIG. 29. Then assume that the data for the CIMs is to be transmitted first to LCU 1, then to LCU 2 and then to LCU 3 on the basis of the above assumption.

The content of the scan table SCNTBL under foregoing assumptions is shown in FIG. 30. Specifically, LCU 1 is involved first which has a CIM having an address 7, and therefore the table address +0 stores the addresses 7, 1. Similarly, LCU 2 which is next involved has a CIM having an address 8 and therefore the table address +1 stores the addresses 8, 2. Finally, LCU 3, which has a CIM having an address 3, has the addresses 3, 3 written at table address +2.

Now, from the terminal relationships indicated in FIG. 29, it is seen that the content of the table CCTBL is as shown in FIG. 31. The numerals 4, 0, 8 which make up the left side of the second byte indicate the AND state (0, 1), independent state (0, 0) and OR state (1, 0) in FIG. 13, respectively. In other words (0,0), (0, 1) and (1, 0) in FIG. 13 are handled as the most significant two bits of a four-bit binary number and are described as 0, 4 and 8, respectively, in FIG. 31. The other aspects of the table of FIG. 31 will be explained later.

Since the monitor table STATTB and the control table CNTLTB are first cleared (during the initialization process of FIG. 20), the initial condition of these tables is as shown in FIG. 32. In these tables STATTB and CNTLTB, as shown in FIG. 15, the bits from the most significant one of the first byte to the 6th significant bit of the second byte represent the DIO (terminal) number of the CIM. In this connection, as shown in FIG. 35, the first and second bytes of this table CNTLTB are segmented into four-bit segments, so that the information on connection to the CIM ("0" indicates unconnected, and "1" connected) is represented by a four-bit binary number which in turn is indicated by a decimal number.

Figure 28:
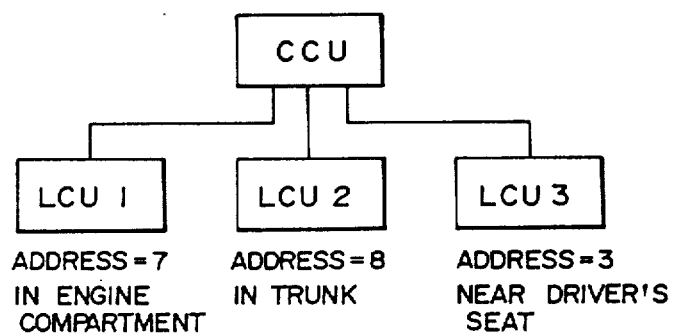
FIG. 28 is a diagram illustrating a simplified configuration of the collective wiring system for explaining the operation of the present invention.

Further, in FIG. 28, LCU 3 corresponds to LCU No. 1 in FIG. 10. As a result, even when the switches are not operated at all while the automobile is parked, the CCU and the LCU 3 and O/Es between them are always operated once the process of FIG. 20 is started, thus the monitoring of the operation of these switches in maintained.

Now assume that the ignition switch is turned on to initiate IG.SW.Acc. As clear from FIG. 31, this indicates that the CIM address 3 of LCU 3, that is, the terminal No. 3 has turned to "1", and therefore the content of the table CNTLTB is changed from the state of FIG. 32 to that of FIG. 34 by the TOCFI process (FIG. 21). See FIG. 33 (A). This results in a difference in the data between the receiving and transmitting tables STATTB and CNTLTB, respectively.

Then, this difference is detected by the CONNECT process (FIG. 25) in the RESTART process (FIG. 20), with the result that a noncoincident part is detected followed by inversion of the noncoincident part of the control table CNTLTB, thus producing the content of the monitor table STATTB as shown in FIG. 35. Further, the PWRCTL process (FIG. 23) in the RESTART process (FIG. 20) supplies power to LCU 1, LCU 2 and O/Es thereof to energize the same.

In the meantime, the MON process (FIG. 24) by reference to the fail flag of the table STATTB continues to monitor whether data transmission is normal or not.

Because the monitor table STATTB has assumed the state shown in FIG. 34 indicates that, as explained above, the CIM terminal No. 3 of LCU 3 has become "1", which in turn means that the LCU and the CIM are both 3. Then, in view of the fact that as evident from FIG. 30, the sequence of CIMs making up the input sources is indicated by the address 2 of the scan table SCNTBL, and that the terminal of this CIM is No. 3, the connection table CCTBL of FIGS. 9 and 28 is searched. Under this condition, the first byte on the connection table CCTBL is (0, 2), and the most significant four bits of the third byte is (3), so that the address CCTBL +0 of the table of FIG. 31 is involved first. Since the low digit of the second byte of this address CCTBL +0 is 1, and the low digit of the third byte thereof is 2, it is seen that the destination CIM involved is represented by the address 1 of the scan table SCNTBL in FIG. 30, that is, CIM 8 of LCU 2 associated with the rear window defroster connected to terminal No. 2.

Figure 36:
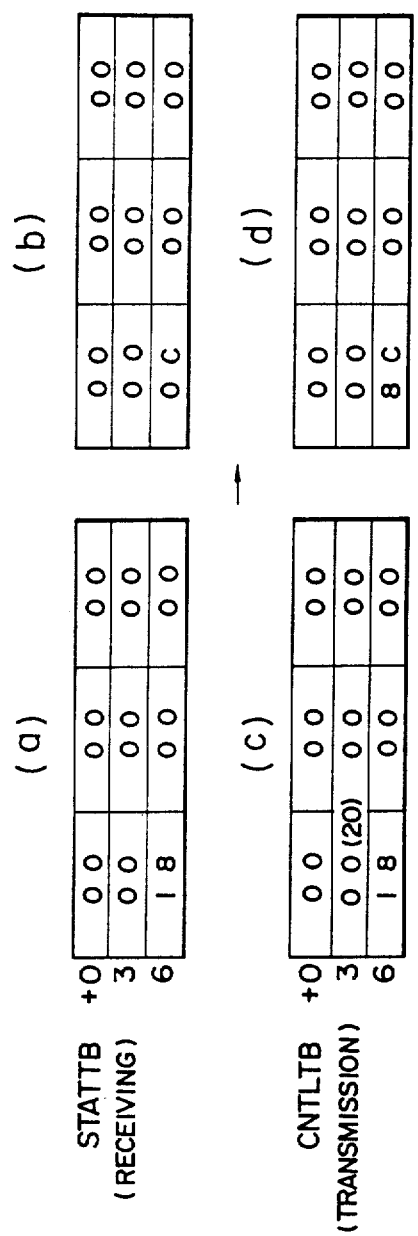

Further assume that when the ignition switch is turned on, it is first positioned at IGNITION ON and then transferred to START. Thus, CIM terminal No. 4 in addition to CIM terminal No. 3 of LCU 3 becomes "1", so that the table STATTB changes as shown in FIG. 36 (a). See FIG. 33(c). Then, the table changes to the state as shown in FIG. 36(b). See FIG. 33(B).

In correspondence with this change of the monitor table STATTB, the control table CNTLTB also changes first to the state as shown in FIG. 36(c), and then to the state as shown in FIG. 36 (d). See FIG. 33(D). The first byte of the address 3 in FIG. 36(c) is either 0, 0 or 2, 0 for the reason mentioned below. As evident from FIGS. 29 and 30, when the first byte of the address 6 of the monitor table STATTB is 1, 0, one of the conditions for logic product to achieve the state 2, 0 of the first byte of the address 3 is satisfied. Clear definition is not yet made, and therefore two cases are shown, as in the case of the transmitting table of FIG. 35. On the other hand, the reason why the control table CNTLTB changes to the state shown in FIG. 36(d) as a result of the monitor table STATTB becoming as shown in FIG. 36(b) will be described below. When the first byte of the address 6 of the monitor table STATTB becomes 0, C, it is seen from FIGS. 29 and 31 that the terminal No. 0 of the same CIM is required to become "1". In this way, once the ignition switch is operated to the start position, the starter motor is turned on.

Now, assume that the parking lamp switch is turned on. From FIG. 29, it is seen that the CIM terminal No. 10 of LCU 3 becomes "1", with the result that the monitor table STATTB assumes the state as shown in FIG. 37. Under this condition, the address corresponding to the table connection CCTBL is CCTBL +27, +30, and further both ORTBL +3 and ORSTOP are referenced. Since the OR condition is involved, the first byte of the address +0 of the control table CNTLTB is changed to 2, 0 and the first byte of the address +3 to 8, 0 respectively, while at the same time changing the second byte of the address +6 to 2, 0 as shown in FIG. 37 without taking the other inputs into consideration. Under this condition, therefore, as evident from FIG. 29, the clearance lamp and the tail lamp are lit to achieve the required operation.

It will be understood from the foregoing description that according to the present invention, many parts of the processes required for data transmission control by the microcomputer in a collective wiring system of an automobile or the like are performed by table search, so that the disadvantages of the prior art are eliminated, thereby sufficiently increasing the speed of control by the collective wiring system of an automobile or the like.

What is claimed is:

1. A method of control of vehicle accessory devices using a collective wiring system for an automobile in which data is transmitted via a series data transmission system between a plurality of vehicle input terminals, connected to input devices, and a plurality of vehicle output terminals, connected to said vehicle accessory devices, under control of a central control unit of a stored control program and having a memory for storing data, comprising the steps performed by said central control unit of:

(a) storing in memory a scan table of addresses of all of said vehicle input terminals and said vehicle output terminals in a predetermined order in which said terminals are to be periodically accessed;

(b) periodically checking the operation status of each of said input devices connected to said vehicle input terminals in accordance with the order of addresses provided in said scan table;

(c) storing in memory the result of said checking of the operation status of said input devices in the form of a status table;

(d) storing in memory a desired control condition of each of said vehicle accessory devices in the form of a control table;

(e) updating the control condition information for said vehicle accessory devices in said control table under control of said stored control program on the basis of said operation status of said input devices in said status table using connection information indicating a relationship between said vehicle input terminals and said vehicle output terminals; and (f) sending control command signals from said central control unit via said series data transmission system to said vehicle output terminals in accordance with said stored control program and the order of addresses in said scan table to control the operating condition of said vehicle accessory devices on the basis of said control condition information in said control table.

2. A method of control of vehicle accessory devices according to claim 1, wherein said step (b) includes generating in said central control unit a request message requesting operating status information, applying said request message as parallel data to said series data transmission system, converting parallel data to series data in said series data transmission system using a shift register, and sending said series data to an input terminal via said series data transmission system.

3. A method of control of vehicle accessory devices according to claim 2, wherein said step (b) further includes receiving via said series data transmission system a reply message as series data from an input terminal, converting said series data to parallel data in said series data transmission system using said shift register and sending said parallel data to said central control unit.

4. A method of control of vehicle accessory deices according to claim 1, wherein said step (f) includes generating control command signals as parallel data in said central control unit, applying said generated control command signals to said series transmission system, converting parallel data to series data in said series data transmission system using a shift register, and sending said series data to an output terminal via said series data transmission system in accordance with said scan table.

5. A method of control of vehicle accessory devices according to claim 1, wherein said vehicle accessory devices include lamps, motors and switches.

* * * * *